US012810646B2

(12) United States Patent
Nakamura

(10) Patent No.: US 12,810,646 B2
(45) Date of Patent: Nov. 24, 2026

(54) BIOLOGICAL INFORMATION ACQUISITION ASSISTANCE DEVICE AND BIOLOGICAL INFORMATION ACQUISITION ASSISTANCE METHOD

(71) Applicant: PANASONIC INTELLECTUAL PROPERTY MANAGEMENT CO., LTD., Osaka (JP)

(72) Inventor: Hideyuki Nakamura, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 19/143,318

(22) PCT Filed: Dec. 21, 2023

(86) PCT No.: PCT/JP2023/046031
§ 371 (c)(1),
(2) Date: Jun. 25, 2025

(87) PCT Pub. No.: WO2024/143176
PCT Pub. Date: Jul. 4, 2024

(65) Prior Publication Data

US 2026/0105774 A1 Apr. 16, 2026

(30) Foreign Application Priority Data

Dec. 28, 2022 (JP) ................................ 2022-212090

(51) Int. Cl.
*G06V 40/13* (2022.01)
*G06F 3/0481* (2022.01)
*G06T 7/70* (2017.01)

(52) U.S. Cl.
CPC ........ *G06V 40/1312* (2022.01); *G06F 3/0481* (2013.01); *G06T 7/70* (2017.01)

(58) Field of Classification Search
CPC ...... G06V 40/1312; G06F 3/0481; G06T 7/70
See application file for complete search history.

(56) References Cited

U.S. PATENT DOCUMENTS 6,970,181 B1 11/2005 Fadel
9,361,507 B1 6/2016 Hoyos et al.
(Continued)

FOREIGN PATENT DOCUMENTS

JP 2013-121097 6/2013
JP 2020-013393 1/2020
(Continued)

OTHER PUBLICATIONS

International Search Report (ISR) from International Searching Authority (Japan Patent Office) in International Pat. Appl. No. PCT/JP2023/046031, dated Feb. 20, 2024, together with an English language translation.

*Primary Examiner* — Premal R Patel
(74) *Attorney, Agent, or Firm* — Greenblum & Bernstein, P.L.C.

(57) ABSTRACT

A biometric information acquisition assistance device includes an acquisition unit configured to acquire a captured image of at least one fingertip captured in a contactless state, a detection unit configured to detect the at least one fingertip shown in the captured image, a generation unit configured to generate a first fingertip image obtained by cutting out a fingertip region including the detected fingertip, and a control unit configured to generate a biometric information acquisition screen including the captured image and a second fingertip image disposed outside a first region including the fingertip region of the fingertip and obtained by enlarging the first fingertip image, and output the biometric information acquisition screen to a monitor.

18 Claims, 11 Drawing Sheets

(56) References Cited

U.S. PATENT DOCUMENTS

| | | | | |
|---|---|---|---|---|
| 2010/0194713 | A1* | 8/2010 | Kawashima | G06F 3/04883 345/175 |
| 2016/0180142 | A1* | 6/2016 | Riddle | G06V 40/1312 382/124 |
| 2016/0232401 | A1 | 8/2016 | Hoyos et al. | |
| 2016/0321496 | A1 | 11/2016 | Mather et al. | |
| 2018/0018501 | A1 | 1/2018 | Mather et al. | |
| 2018/0165508 | A1 | 6/2018 | Othman et al. | |
| 2019/0303549 | A1* | 10/2019 | Tanabe | G06F 1/1626 |
| 2019/0333479 | A1* | 10/2019 | Maalouf | G09G 5/14 |
| 2019/0362130 | A1 | 11/2019 | Othman et al. | |
| 2020/0110921 | A1 | 4/2020 | Mather et al. | |
| 2022/0165087 | A1 | 5/2022 | Mather et al. | |
| 2022/0215686 | A1 | 7/2022 | Othman et al. | |
| 2023/0009157 | A1 | 1/2023 | Nakamura et al. | |
| 2024/0371205 | A1 | 11/2024 | Nakamura et al. | |

FOREIGN PATENT DOCUMENTS

| | | | | |
|---|---|---|---|---|
| JP | 2020-501264 | | 1/2020 | |
| KR | 20210071384 | A * | 6/2021 | G06V 40/12 |
| WO | 2021/117877 | | 6/2021 | |

* cited by examiner

BIOLOGICAL INFORMATION ACQUISITION ASSISTANCE DEVICE AND BIOLOGICAL INFORMATION ACQUISITION ASSISTANCE METHOD

TECHNICAL FIELD

The present disclosure relates to a biometric information acquisition assistance device and a biometric information acquisition assistance method.

BACKGROUND ART

Patent Literature 1 discloses a method for performing fingerprint recognition in which a feature of each of a plurality of fingers of a subject is extracted using a mobile device, and a biometric identifier including the extracted feature is generated and stored in a memory. A method for performing fingerprint recognition includes capturing images of a plurality of fingers of a subject by a camera, a storage medium, an instruction stored in the storage medium, and a mobile device that executes the instruction, detecting the plurality of fingers drawn in the images by a fingertip detection algorithm to identify respective fingertip segments of the plurality of fingers, extracting features of the plurality of fingers from the respective identified fingertip segments, generating a biometric identifier including the extracted features, and storing the biometric identifier in the memory.

CITATION LIST

Patent Literature

Patent Literature 1: JP2020-501264A

SUMMARY OF INVENTION

Technical Problem

In the configuration of Patent Literature 1, a marking or a guide for instructing a user to place fingers is displayed on a display to guide the placement of the fingers of the user to be imaged. However, for example, since the size of the finger is different for each user depending on factors such as gender and age, there is a possibility that the images of the plurality of fingers captured by the method of Patent Literature 1 in the related art are not in focus on the fingerprint.

The present disclosure has been devised in consideration of the above-mentioned circumstances of the related art, and an object of the present disclosure is to provide a biometric information acquisition assistance device and a biometric information acquisition method that assist in acquisition of fingerprint data suitable for fingerprint authentication in a contactless state.

Solution to Problem

According to the present disclosure, there is provided a biometric information acquisition assistance device including an acquisition unit configured to acquire a captured image of at least one fingertip captured in a contactless state, a detection unit configured to detect the at least one fingertip shown in the captured image, a generation unit configured to generate a first fingertip image obtained by cutting out a fingertip region including the detected fingertip, and a control unit configured to generate a biometric information acquisition screen including the captured image and a second fingertip image disposed outside a first region including the fingertip region of the fingertip and obtained by enlarging the first fingertip image, and output the biometric information acquisition screen to a monitor.

According to the present disclosure, there is provided a biometric information acquisition assistance method which is performed by a biometric information acquisition assistance device capable of acquiring biometric information from at least one fingertip, the biometric information acquisition assistance method including acquiring a captured image of the at least one fingertip in a contactless state, detecting the at least one fingertip shown in the captured image, generating a first fingertip image obtained by cutting out a fingertip region including the detected fingertip, and generating a biometric information acquisition screen including the captured image and a second fingertip image disposed outside a first region including the fingertip region of the fingertip and obtained by enlarging the first fingertip image and outputting the biometric information acquisition screen to a monitor.

Advantageous Effects of Invention

According to the present disclosure, it is possible to assist in acquisition of fingerprint data suitable for fingerprint authentication in a contactless state.

DESCRIPTION OF EMBODIMENTS

Background of Present Disclosure

Figure 1:
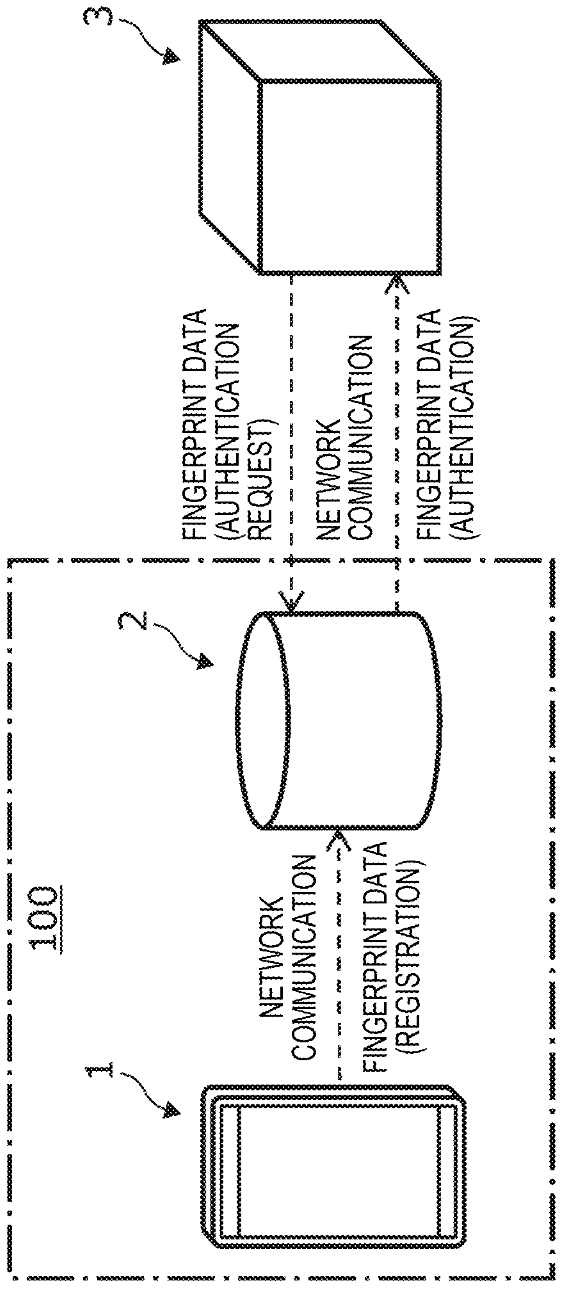
FIG. 1 is an explanatory diagram of a use case example of a fingerprint authentication system according to Embodiment 1.

In the related art, in a personal authentication device, when fingerprint registration for fingerprint authentication is performed, a user needs to go to a facility (for example, a store, an office, or the like) using fingerprint authentication and register a fingerprint, and thus usability is low. As a method for solving such a problem, there is a fingerprint registration method in which fingerprint registration is performed by a terminal device owned by a user. However, in a case where the user captures an image of a fingerprint by himself/herself, the fingerprint is not in focus when the user captures an image by bringing the fingertip too close to the terminal device, and the fingertip displayed on the terminal device becomes small when the user captures an image by moving the fingertip away from the terminal device, which makes it difficult to visually recognize whether the fingerprint is in focus. In addition, in general, a terminal device such as a smartphone or a tablet terminal carried by a user includes a wide-angle camera, and thus it is difficult to capture an image in focus on the fingerprint of a fingertip.

Therefore, in the related art, a method for acquiring a fingerprint image in which it is possible to confirm whether the fingerprint of the fingertip is in focus by displaying an enlarged image obtained by enlarging an image of the fingertip shown in a captured image on a screen of a terminal device is considered. However, in a case where the user adjusts a position of the fingertip while viewing the enlarged image, it is difficult for the user to intuitively grasp a position of a hand with respect to the terminal device because a magnification of the enlarged image displayed on the screen is not known, and when the user moves his/her hand more than necessary, his/her fingers tend to move out of the camera's field of view, making it difficult for the user to adjust the position of his/her fingertip so that the fingerprint is in focus.

Therefore, in each embodiment described below, an example of a biometric information acquisition assistance device and a biometric information acquisition assistance method that assist in acquisition of fingerprint data suitable for fingerprint authentication in a contactless state will be described.

Hereinafter, the embodiment in which a configuration and an operation of the biometric information acquisition assistance device and the biometric information acquisition assistance method according to the present disclosure are specifically disclosed will be described in detail with reference to the drawings as appropriate. However, unnecessarily detailed description may be omitted. For example, the detailed descriptions of well-known matters and the redundant description of substantially the same configuration may be omitted. This is to avoid unnecessary redundancy of the following description and facilitate understanding of those skilled in the art. The accompanying drawings and the following description are provided for those skilled in the art to fully understand the present disclosure, and are not intended to limit the subject matters described in the claims.

Embodiment 1

Figure 2:
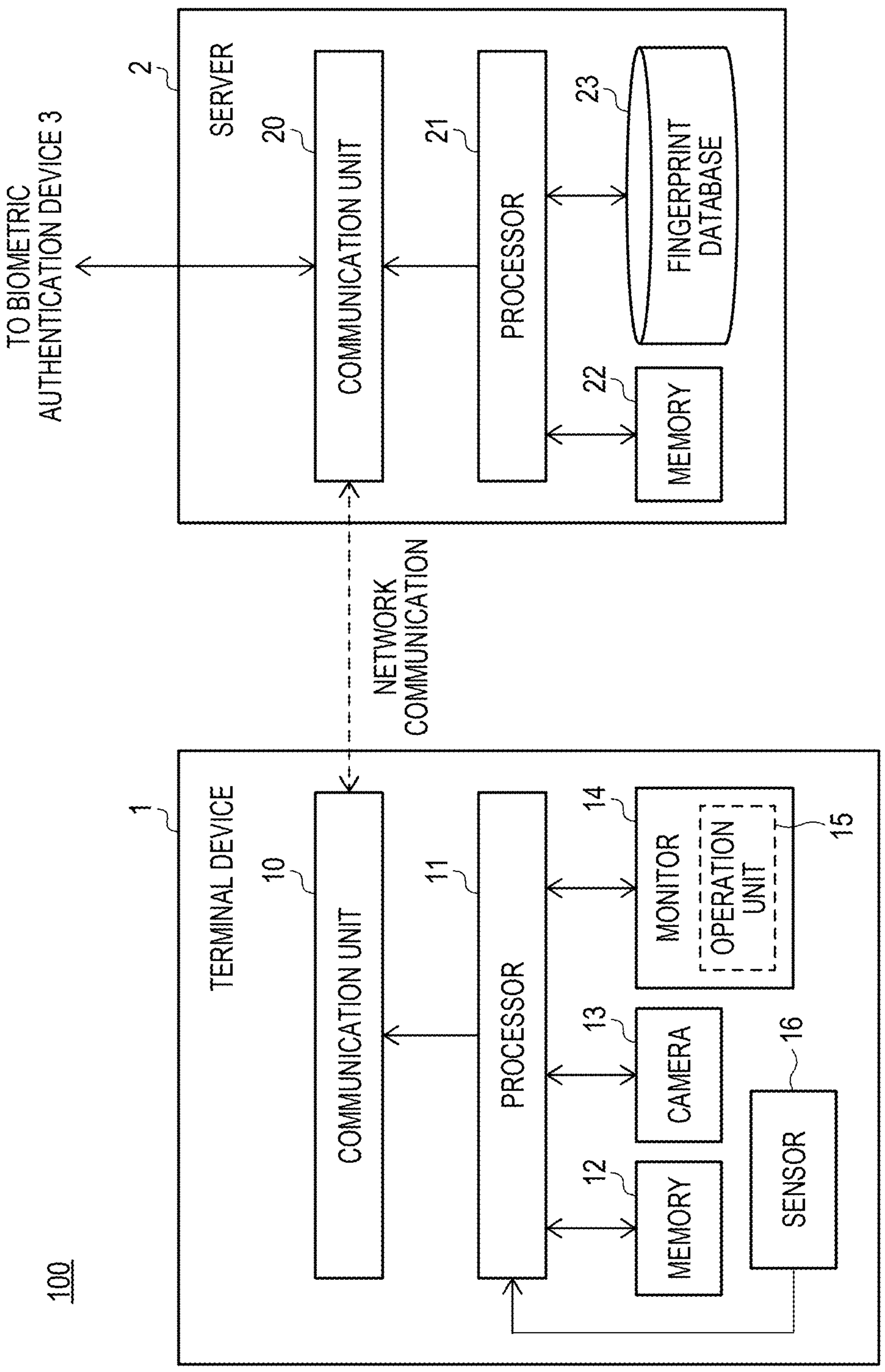
FIG. 2 is a diagram illustrating an internal configuration example of a terminal device and a server according to Embodiment 1.

A use case and an internal configuration of a fingerprint registration system 100 according to Embodiment 1 will be described with reference to FIGS. 1 and 2. FIG. 1 is an explanatory diagram of a use case example of the fingerprint registration system 100 according to Embodiment 1. FIG. 2 is a diagram illustrating an internal configuration example of a terminal device 1 and a server 2 according to Embodiment 1.

The fingerprint registration system 100 according to Embodiment 1 acquires fingerprint data (for example, a first fingertip image, a fingerprint feature, and the like to be described later) of a fingertip from a captured image of any one (for example, a middle finger, an index finger, or the like) of any or designated fingers.

The fingerprint registration system 100 according to Embodiment 1 includes a terminal device 1 and a server 2. Further, a biometric authentication device 3 is a device that performs fingerprint authentication using fingerprints fingerprint-registered by the terminal device 1 and the server 2. The fingerprint registration system 100 according to Embodiment 1 is communicably connected between the terminal device 1 and the server 2 via a network, and performs transmission and reception of data. Similarly, the server 2 and the biometric authentication device 3 are communicably connected to each other via a network and perform transmission and reception of data.

The terminal device 1 acquires fingerprint data. The server 2 registers the fingerprint data transmitted from the terminal device 1. The fingerprint authentication is performed by the server 2 and the biometric authentication device 3. The biometric authentication device 3 illustrated in FIG. 1 is preferably a fingerprint authentication device capable of realizing sanitary contactless fingerprint authentication from the viewpoint of use by an unspecified number of users, but is not limited thereto.

The terminal device 1 as an example of a biometric information acquisition assistance device captures an image of a region including at least one finger of a user based on a user operation, generates fingerprint data used for fingerprint registration based on a fingerprint of a fingertip shown in the captured image, and transmits the fingerprint data to the server 2. The terminal device 1 is realized by, for example, a smartphone, a tablet terminal, or the like. The terminal device 1 includes a communication unit 10, a processor 11, a memory 12, a camera 13, a monitor 14, and an operation unit 15.

The communication unit 10 as an example of an acquisition unit is connected to a communication unit 20 of the server 2 via a network so as to be able to communicate data with each other. The communication unit 10 may be connected to the communication unit 20 of the server 2 in a manner of wireless communication or wired communication. The wireless communication here is, for example, short-range wireless communication such as Bluetooth (registered trademark) or NFC (registered trademark), or communication via a wireless local area network (LAN) such as Wi-Fi (registered trademark). The communication unit 10 transmits the fingerprint data of the user generated by a processor 21, user information capable of identifying the user, and the like to the communication unit 20 of the server 2.

The processor 11, which is an example of a detection unit, a generation unit, a control unit, and an evaluation unit, is implemented using, for example, a central processing unit (hereinafter referred to as "CPU") or a field programmable gate array (hereinafter, referred to as an "FPGA"), and executes various processing and controls in cooperation with the memory 12. Specifically, the processor 11 refers to programs and data stored in the memory 12 and executes the programs to realize various functions related to capturing an image of a fingerprint and acquiring fingerprint data.

When an application capable of acquiring a fingerprint is started by a user operation, the processor 11 generates and outputs a control instruction for causing the camera 13 to start capturing an image. The processor 11 acquires the captured image output from the camera 13, and detects at least one fingertip including a first joint and an orientation of the detected fingertip from the captured image obtained by capturing an image of the entire hand or at least one finger of the user. The orientation of the fingertip detected here may be a direction of one finger selected as a generation target of a first fingertip image to be described later.

The processor 11 further detects a fingertip region including at least one fingertip of the detected fingertips to the first joint. The fingertip region here is, for example, a region including the first joint from a tip of each finger.

The processor 11 cuts out a fingertip region of any one fingertip from the detected fingertip region to generate a first fingertip image. That is, the first fingertip image is an image of a region including at least the tip of the finger and the first joint. Here, the finger for which the first fingertip image is to be generated may be any finger or may be a finger designated in advance (for example, a middle finger that is easy to image and has the largest area, a finger designated by an office, a store, or the like using the biometric authentication device 3, or the like).

In a case where it is determined that the image of the finger of the user is not shown in the captured image captured by the camera 13, the region from the tip of the finger to the first joint is not shown in the captured image, and a finger other than the designated finger is shown in the captured image, the processor 11 generates a message Msg1 (see FIG. 5) indicating that the fingertip is not captured, and outputs the message Msg1 to the monitor 14.

The processor 11 rotates the generated first fingertip image such that the direction of the fingertip shown in the first fingertip image is aligned with a display direction of the image on the monitor 14 or a freely set display direction. The processor 11 detects a region other than the fingertip region (hereinafter, referred to as a "non-fingertip region") based on the detected fingertip region. Based on the detected non-fingertip region, the processor 11 generates a second fingertip image by adjusting (enlarging) the size of the first fingertip image to a size that can be displayed in the non-fingertip region.

Note that the size that can be displayed in the non-fingertip region described here may be the maximum size in the non-fingertip region without changing an aspect ratio of the first fingertip image, or may be the maximum size in the non-fingertip region within a preset magnification (for example, five to eight times). Accordingly, for example, the terminal device 1 can prevent a decrease in resolution of the second fingertip image displayed on the monitor 14 due to the non-fingertip region being large and the magnification of the first fingertip image being too large.

The processor 11 performs rotation and adjustment processing of the first fingertip image, and calculates an evaluation value indicating whether the fingerprint of the fingertip shown in the first fingertip image is in focus, that is, whether the first fingertip image is an image suitable for fingerprint authentication.

The evaluation value may be calculated using various known methods, and is calculated by digitization such as 1 to 100 or 1 to 10. In the fingerprint registration system 100 according to Embodiment 1, the evaluation value described above is described as "100" in an in-focus state and "1" in the out-of-focus state, but it is needless to say that the evaluation value is not limited thereto.

Figure 4:
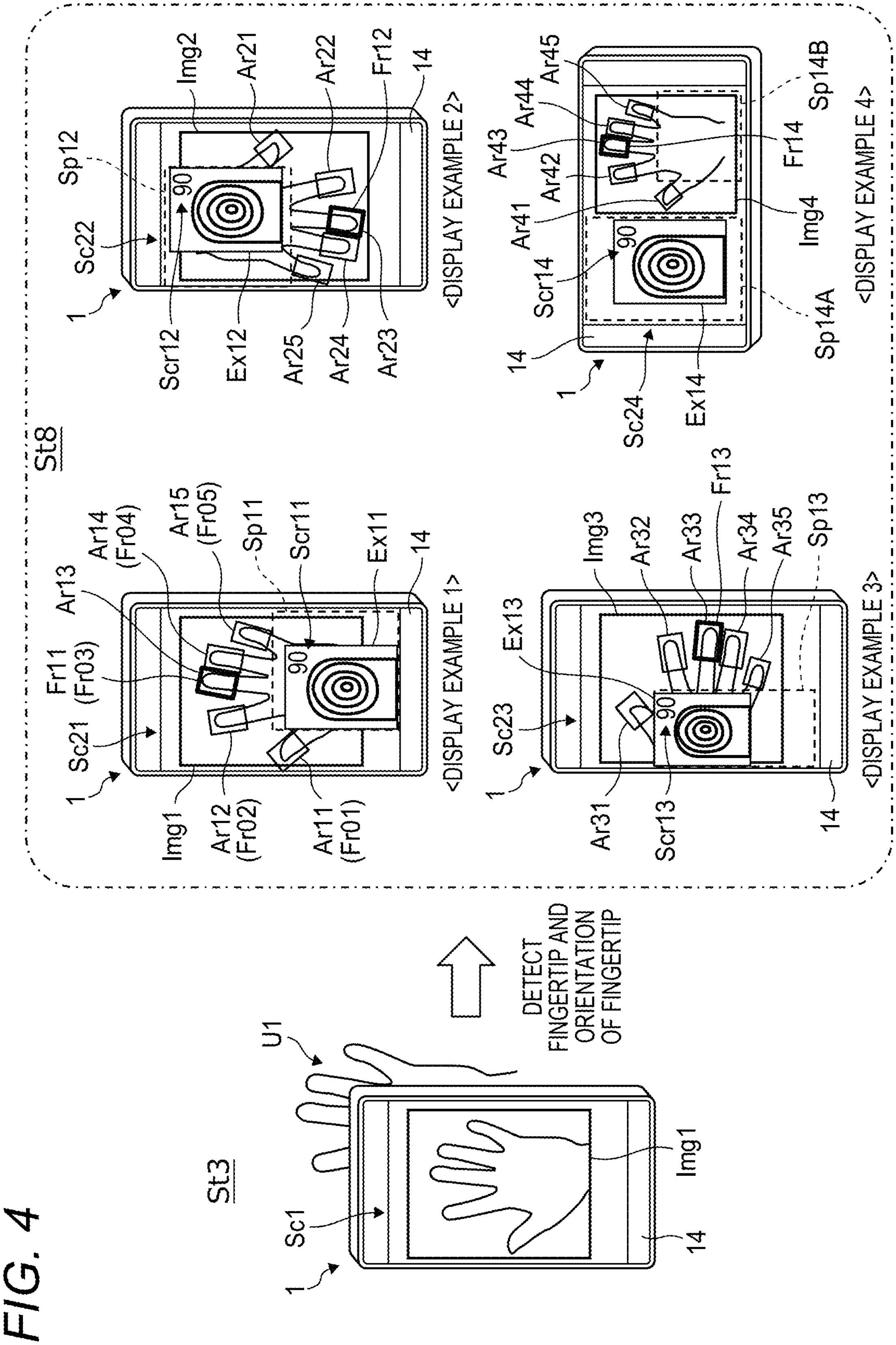
FIG. 4 is a diagram illustrating display examples of a fingertip image.

The processor 11 generates confirmation screens Sc21, Sc22, Sc23, and Sc24 (an example of a biometric information acquisition screen) in which the second fingertip images (for example, second fingertip images Ex11, Ex12, Ex13, and Ex14 illustrated in FIG. 4) and the calculated evaluation values (for example, the evaluation values Scr11, Scr12, Scr13, and Scr14 illustrated in FIG. 4) are superimposed on the non-fingertip regions (for example, non-fingertip regions Sp11, Sp12, Sp13, and Sp14B and a fingertip image display region Sp14A illustrated in FIG. 4) in the captured image, and output the confirmation screens Sc21, Sc22, Sc23, and Sc24 to the monitor 14 to display the confirmation screens thereon.

As a result, the user can intuitively grasp whether the camera 13 is in focus on the fingertip which is an acquisition target for acquiring the fingerprint data based on the enlarged and displayed second fingertip image. Further, based on the evaluation value, the user can intuitively grasp whether the image of the fingertip shown in the second fingertip image has been captured in such a way that fingerprint data suitable for fingerprint authentication can be obtained (that is, a fingerprint feature can be extracted).

The processor 11 determines whether the calculated evaluation value is equal to or greater than a threshold value, and when it is determined that the evaluation value is equal to or greater than the threshold value, the processor 11 performs image analysis processing on the first fingertip image, extracts a feature indicating individual characteristics of the user from the fingerprint shown in the first fingertip image, and performs generation of fingerprint data. The threshold value for determining whether the fingerprint data can be generated is a value indicating that the fingerprint data is suitable for fingerprint authentication.

The fingerprint data referred to here is data indicating a feature of a fingerprint extracted using a known technique (for example, a minutia method, a frequency feature analysis method, or the like). The minutia method is a method for extracting features of a fingerprint by detecting an end point or a branch point (a division) indicating a break of a cut line of the fingerprint in ridge lines of the fingerprint. The frequency feature analysis method is a method for extracting fingerprint features from a waveform of a frequency converted from the unevenness of a fingerprint as a frequency.

After generating the fingerprint data of one fingertip that is a fingerprint registration target, the processor 11 outputs the generated fingerprint data and identification information capable of identifying the user (for example, a name of the user, an identification number, a user ID, and the like) to the communication unit 10 in association with each other, and causes the communication unit 10 to transmit the fingerprint data to the server 2.

The processor 11 may generate a registration screen Sc4 (see FIG. 6) including a first fingertip image Rc (see FIG. 6) in which the evaluation value equal to or greater than the threshold value is calculated, display the registration screen Sc4 on the monitor 14, and cause the user to select whether the fingerprint registration is performed using the fingerprint shown in the first fingertip image Rc. In such a case, the processor 11 performs the generation of the fingerprint data based on a selection (pressing) operation of a registration button Bt2 by the user. The first fingertip image Rc displayed on the registration screen Sc4 may be enlarged to any size and displayed.

The processor 11 transmits the extracted fingerprint data to the server 2 and deletes the first fingertip image used for generating the fingerprint data. Accordingly, the terminal device 1 can prevent leakage of a fingertip (fingerprint) image and improve security. For example, the terminal device 1 may register the fingerprint data by transmitting the data of the first fingertip image for which an evaluation value equal to or greater than a preset threshold value is calculated. The fingerprint data, the fingerprint image, and the user information transmitted to the server 2 via the network may be encrypted and transmitted.

As an example of a storage unit, the memory 12 includes, for example, a random access memory (hereinafter, referred to as a "RAM") as a work memory used when each processing of the processor 11 is executed, and a read only memory (hereinafter, referred to as a "ROM") storing a program and data defining each operation of the processor 11. The RAM temporarily stores data or information generated or acquired by the processor 11. The program that defines the operation of the processor 11 is written in the ROM.

The memory 12 stores the threshold value related to the evaluation value of the first fingertip image, information on the user (for example, personal information capable of specifying an individual user, an employee number, and card information used for settlement) transmitted to the server 2 and stored in association with the fingerprint data, and the like. The information on the user may be input by the user when the fingerprint data is transmitted, and may be deleted when the transmission of the fingerprint data is completed.

The camera 13 includes at least a lens (not illustrated) and an image sensor (not illustrated). The image sensor is, for example, a solid-state imaging element such as a charged-coupled device (CCD) or a complementary metal oxide semiconductor (CMOS), and converts an optical image formed on an imaging surface into an electric signal. The camera 13 starts capturing an image in response to an imaging start control instruction input by the processor 11 or an imaging operation by the user. The camera 13 outputs captured image to the processor 11.

The monitor 14 is implemented by using, for example, a liquid crystal display (LCD) or an organic electroluminescence (EL). The monitor 14 outputs and displays a captured image captured by the camera 13 or various screens generated by the processor 11. In addition, when an alert to the effect that the user captures an image of the fingertip is input from the processor 11, the monitor 14 displays the alert or outputs the alert by voice using a speaker (not illustrated).

The monitor 14 is included in the terminal device 1 and may be a touch interface implemented by a touch panel. In such a case, the monitor 14 has a function as the operation unit 15, receives an input operation by the user, and outputs a result of the input operation by the user to the processor 11.

The operation unit 15 can receive a user operation such as an operation for starting an application, acquisition (registration) of the fingerprint data, a reacquisition operation, and an input operation of information on a user, and outputs the result of the input operation to the processor 11. The operation unit 15 may be realized as a touch panel of the monitor 14 described above. The operation unit 15 may include a microphone (not illustrated) and receive a voice input operation based on the voice of the user.

The sensor 16 is realized by, for example, a gyro sensor, an acceleration sensor, or the like, and can detect a gravity direction applied to the terminal device 1. The sensor 16 outputs information on the detected gravity direction to the processor 11. The processor 11 changes a screen display direction of the monitor 14 between horizontal orientation display and vertical orientation display based on the information on the gravity direction output from the sensor 16.

The server 2 acquires the fingerprint data and the user information transmitted from the terminal device 1, stores the fingerprint data and the user information for each user (that is, fingerprint registration), and performs user authentication (that is, the fingerprint authentication) using a fingerprint based on the fingerprint data or the fingertip (fingerprint) image received from the biometric authentication device 3. The server 2 includes the communication unit 20, the processor 21, a memory 22, and a fingerprint database 23.

The communication unit 20 is connected to the communication unit 10 in the terminal device 1 and the biometric authentication device 3 so as to be able to communicate data via a network. The communication unit 20 may be connected to the communication unit 10 in the terminal device 1 so as to be able to perform wireless communication. The communication unit 20 receives the fingerprint data and the user information from the terminal device 1. The communication unit 20 acquires the fingerprint data from the biometric authentication device 3 and transmits a user authentication result to the biometric authentication device 3.

The processor 21 is implemented by using, for example, a CPU or an FPGA, and executes various processing and controls in cooperation with the memory 22. Specifically, the processor 21 refers to a program and data stored in the memory 22 and executes the program, thereby implementing a registration function of fingerprint data or a fingerprint image and a user authentication (fingerprint authentication) function.

The processor 21 outputs and stores (registers) the fingerprint data and the user information transmitted from the terminal device 1 to the fingerprint database 23.

When the fingerprint data transmitted from the biometric authentication device 3 is acquired, the processor 21 collates each of the plurality of fingerprint data stored in the fingerprint database 23 with the acquired fingerprint data. The processor 21 performs the user authentication based on whether there is fingerprint data having individual characteristics same as or similar to the acquired fingerprint data, generates the user authentication result, and transmits the user authentication result to the biometric authentication device 3.

The memory 22 includes, for example, a RAM as a work memory used when each processing of the processor 21 is executed, and a ROM that stores a program and data defining an operation of the processor 21. The RAM temporarily stores data or information generated or acquired by the processor 21. The program that defines the operation of the processor 21 is written into the ROM.

The fingerprint database 23 is a so-called storage, and is implemented by a storage medium such as a flash memory, a hard disk drive (HDD), or a solid state drive (SSD). The fingerprint database 23 stores (registers) and manages the fingerprint data and the user information transmitted from the terminal device 1 for each user. The fingerprint database 23 may be configured by an external storage or the like externally connected to the server 2 and configured separately.

The biometric authentication device 3 is installed in, for example, a facility (for example, an office, a store, or the like) where the user authentication using a fingerprint is performed, transmits a fingertip (fingerprint) image or fingerprint data of a user acquired in a contact state or a contactless state to the server 2, and requests the user authentication. The biometric authentication device 3 illustrated in FIG. 1 includes a communication unit, a processor, a memory, a camera capable of capturing an image of a fingerprint, a fingerprint sensor, and the like for realizing the above-described functions, but illustration and description thereof will be omitted.

Figure 3:
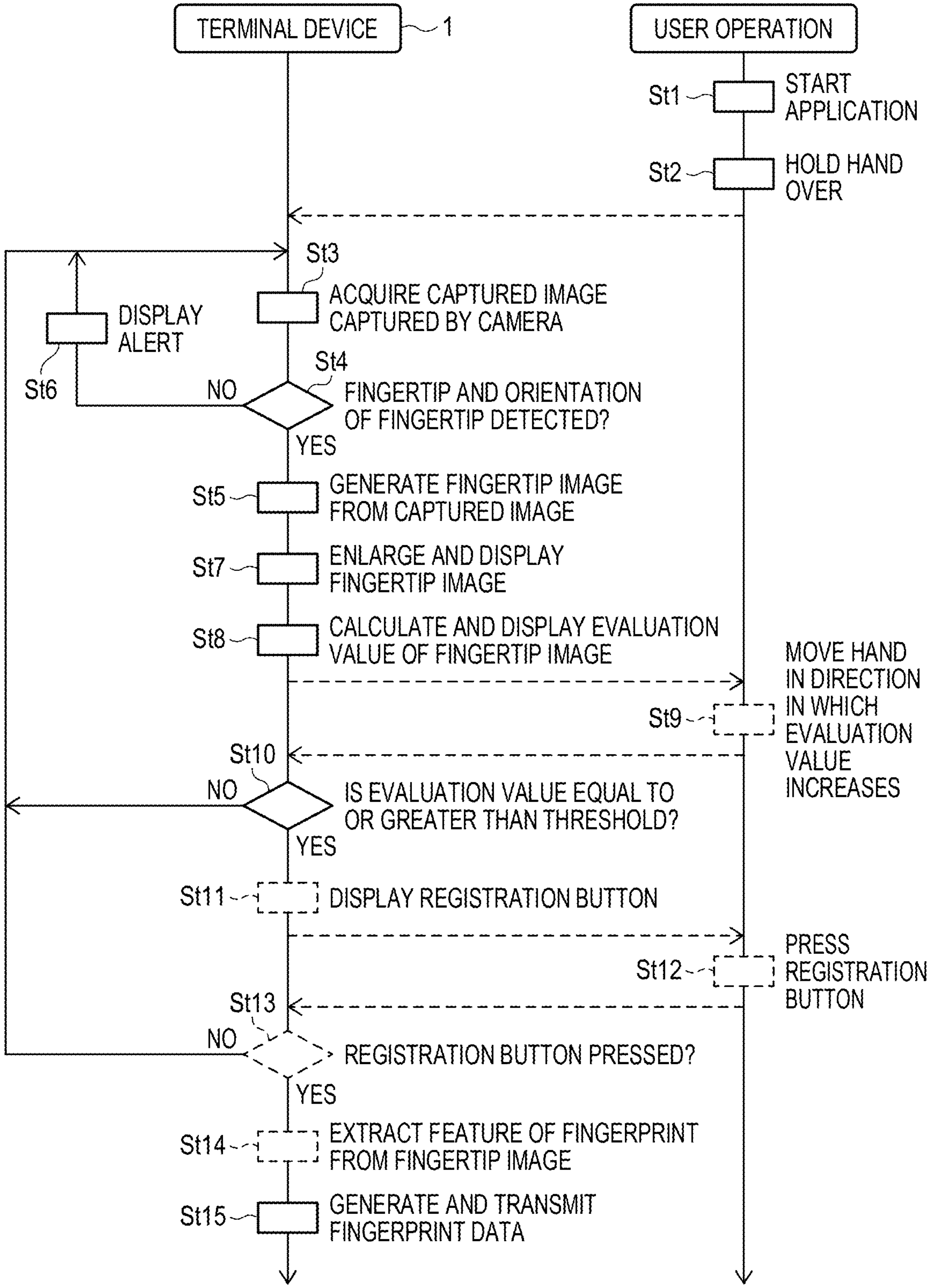
FIG. 3 is a sequence diagram illustrating an operation procedure and an operational procedure example of the terminal device according to Embodiment 1.

Next, an operational procedure example of the terminal device 1 according to Embodiment 1 will be described with reference to FIG. 3. FIG. 3 is a sequence diagram illustrating an operation procedure and an operational procedure example of the terminal device 1 according to Embodiment 1. In the description of FIG. 3, the operation procedure and the operational procedure example of the terminal device 1 will be specifically described with reference to each of an imaging screen Sc1 (see FIG. 4), the confirmation screen Sc21 (see FIG. 4), an alert screen Sc31 (see FIG. 5), and the registration screen Sc4 (see FIG. 6).

First, the user operates the terminal device 1 to start an application capable of performing the fingerprint registration (St1). The terminal device 1 performs the start of the application based on a user operation, and generates and outputs the control instruction for causing the camera 13 to start capturing an image. The user holds the entire hand or one finger including at least the first joint of the user in an imaging region of the camera 13 included in the terminal device 1 (St2).

The camera 13 outputs a captured image Img1 to the processor 11. The processor 11 acquires the captured image Img1 captured by the camera 13 (St3) and displays the captured image Img1 on the monitor 14.

The processor 11 performs image analysis on the captured image Img1 and detects the fingertips including at least the first joint and the orientation of each detected fingertip. The processor 11 determines whether at least one fingertip and the orientation of the fingertip have been detected from the captured image Img1 (St4).

In the processing of step St4, when it is determined that at least one fingertip and the orientation of the fingertip have been detected from the captured image Img1 (St4, YES), the processor 11 superimposes a detection frame Fr11 on the captured image Img1 in a region including the first joint of the detected fingertip and displays the superimposed image on the monitor 14. In addition, the processor 11 cuts out the fingertip region of one fingertip including at least the first joint from the captured image Img1 to generate the first fingertip image (St5).

The fingertip on which the detection frame Fr11 is superimposed may be at least one fingertip that is a fingerprint data acquisition (registration) target, that is, only the fingertip on which the first fingertip image is generated and the second fingertip image Ex11 is displayed on the monitor 14. As a result, the user can intuitively grasp which finger's fingertip the finger shown in the second fingertip image Ex11 belongs to. When the fingertips on which the detection frame is superimposed are a plurality of or all detected fingers, the processor 11 may highlight only the detection frame superimposed on the fingertip shown in the second fingertip image Ex11 displayed on the monitor 14 with, for example, a thick line, a predetermined color, or the like.

On the other hand, in the processing of step St4, when it is determined that at least one fingertip and the orientation of the fingertip are not detected from the captured image Img1 (St4, NO), the processor 11 generates the alert screen Sc31 including the message Msg1 "please show your fingertip" requesting the user to hold the fingertip in the imaging region of the camera 13, and outputs the alert screen Sc31 to the monitor 14 to display the alert screen Sc31 thereon (St6). The message Msg1 may be output by voice. After the processing of step St6, the processor 11 proceeds to the processing of step St3 and acquires the captured image from the camera 13 again.

The processor 11 detects the non-fingertip region in which the fingertip is not detected in the captured image. Here, each of the fingertip region and the non-fingertip region will be described below using a specific example.

The fingertip region according to Embodiment 1 may be detected only for at least one fingertip that is a fingerprint data acquisition (registration) target, but is not limited thereto. Specifically, when the finger that is the fingerprint data acquisition (registration) target is the middle finger, the processor 11 sets a region including the tip of the detected middle finger to the first joint as a fingertip region Ar13. That is, the fingertip region Ar13 is detected as a substantially rectangular region having a long side along a direction of the detected middle finger. When fingertip regions of a plurality of fingertips are detected, the processor 11 detects fingertip regions Ar11, Ar12, Ar13, Ar14, and Ar15 corresponding to the plurality of or all fingertips shown in the captured image Img1 as illustrated in FIG. 4.

The non-fingertip region indicates a region other than the fingertip region in the entire display able region of the monitor 14 (for example, the entire confirmation screen Sc21).

Specifically, for the non-fingertip region, when the fingertip region Ar13 is detected only for the middle finger (that is, one finger) that is the fingerprint data acquisition (registration) target, a region other than the fingertip region Ar13 in the entire region of the monitor 14 (the confirmation screen Sc21) is set as the non-fingertip region. For the non-fingertip region, when the fingertip regions Ar11 to Ar15 are detected corresponding to all (that is, a plurality of) detected fingertips, a region other than the fingertip regions Ar11 to Ar15 in the entire region of the monitor 14 (the confirmation screen Sc21) is set as the non-fingertip region.

The processor 11 rotates and enlarges the second fingertip image Ex11 based on the set size of the non-fingertip region and the current orientation of the monitor 14, and displays the second fingertip image Ex11 in the non-fingertip region on the monitor 14 in a superimposed manner (St7).

The processor 11 calculates an evaluation value indicating a degree (likelihood) of focus on the fingerprint shown in the first fingertip image, and outputs the calculated evaluation value Scr11 to the monitor 14 to display the calculated evaluation value Scr11 thereon (St8). Accordingly, the user can visually recognize whether the fingerprint of the fingertip shown in the second fingertip image Ex11 is in focus based on the second fingertip image Ex11 and the evaluation value Scr11.

The user moves his/her hand in a direction in which the evaluation value increases while visually recognizing the second fingertip image Ex11 and the evaluation value Scr11 displayed on the monitor 14 (St9). Since the processing of step St9 is performed when the evaluation value Scr11 is not equal to or greater than the threshold value, the process is not essential and may be omitted. Here, the processor 11 adjusts a focus position of the camera 13 such that the calculated evaluation value becomes a larger value using an autofocus function of the camera 13 and an evaluation value calculation function.

The processor 11 determines whether the calculated evaluation value Scr11 is equal to or greater than the threshold value (for example, 90, 95, or the like) (St10).

When it is determined in the processing of step St10 that the calculated evaluation value Scr11 is equal to or greater than the threshold value (St10, YES), the processor 11 generates the registration screen Sc4 capable of receiving a user operation as to whether fingerprint data acquisition and fingerprint registration are performed using the first fingertip image, and displays the registration screen Sc4 on the monitor 14 (St11).

For example, the registration screen Sc4 includes a return button Bt1 for canceling the fingerprint data acquisition and fingerprint registration using the first fingertip image Rc, and a registration button Bt2 for performing the fingerprint data acquisition and fingerprint registration using the first fingertip image Rc. The user selects (presses) either the return button Bt1 or the registration button Bt2 displayed on the registration screen Sc4 (St12).

On the other hand, when it is determined in the processing of step St10 that the calculated evaluation value Scr11 is not equal to or greater than the threshold value (St10, NO), the processor 11 returns to the processing of step St3. The processor 11 may return to the processing of step St3 when it is determined that a state in which the evaluation value Scr11 is not equal to or greater than the threshold value has continued for a predetermined time (for example, 30 seconds, one minute, or the like) or more, or may return to the processing of step St3 when it is determined that the evaluation value Scr11 is not equal to or greater than the threshold value continuously a predetermined number of times (for example, 10 times, 15 times, or the like) or more.

The processor 11 determines whether the registration button Bt2 is selected (pressed) by the user operation (St13).

When it is determined in the processing of step St13 that the registration button Bt2 is selected (pressed) by the user operation (St13, YES), the processor 11 extracts the feature of the fingerprint from the first fingertip image (St14) and generates the fingerprint data using the extracted feature of the fingerprint (St15). The processor 11 transmits the generated fingerprint data and the user information to the server 2 in association with each other (St15). After transmitting the fingerprint data, the processor 11 deletes the first fingertip image used for generating the fingerprint data.

The fingerprint data may be the first fingertip image itself. In such a case, the server 2 extracts the feature of the fingerprint from the first fingertip image transmitted from the terminal device 1 (St14), generates the fingerprint data using the extracted feature of the fingerprint, and stores (registers) the fingerprint data in the fingerprint database 23 in association with the user information.

On the other hand, when it is determined in the processing of step St13 that the registration button Bt2 is not selected (pressed) by the user operation (St13, NO), the processor 11 returns to the processing of step St3.

As described above, the terminal device 1 according to Embodiment 1 displays the second fingertip image Ex11 obtained by enlarging the fingertip detected as the fingerprint data acquisition (registration) target to the user, thereby assist in obtaining the fingerprint data (the first fingertip image or the feature of the fingerprint) more suitable for the fingerprint authentication in the contactless state.

In addition, by calculating the evaluation value, the terminal device 1 can visualize to the user whether the fingerprint data suitable for the fingerprint authentication can be acquired from the fingertip shown in the captured image Img1. Accordingly, the terminal device 1 can guide the position of the hand of the user with respect to the camera 13 based on the value of the evaluation value Scr11 displayed on the monitor 14. Therefore, the terminal device 1 can assist a user in capturing an image of his or her fingertip (fingerprint), and can acquire the fingerprint data more suitable for the fingerprint authentication in the contactless state.

In the operational procedure example of the terminal device 1 illustrated in FIG. 3, the processing of step St11 to step St13 is not essential and may be omitted. In such a case, when it is determined that the calculated evaluation value Scr11 is equal to or greater than the threshold value (St10, YES), the processor 11 proceeds to the processing of step St14 or step St15.

The processing of step St14 may be omitted when the first fingertip image for which it is determined that the calculated evaluation value Scr11 is equal to or greater than the threshold value is transmitted to the server 2 as the fingerprint data.

Next, a display example of each of the second fingertip images Ex11 to Ex14 will be described with reference to FIG. 4. FIG. 4 is a diagram illustrating display examples of the second fingertip images Ex11 to Ex14. In FIG. 4, an example in which the middle finger is the fingerprint data acquisition (registration) target will be described as an example.

The processor 11 generates the imaging screen Sc1 including the captured image Img1 captured by the camera 13 and displays the imaging screen Sc1 on the monitor 14. The processor 11 detects the fingertip of the user shown in the captured image Img1 and the orientation of each fingertip by the processing of step St3.

<Display Example 1>

The second fingertip image Ex11 illustrated in a display example 1 is an image generated based on the captured image Img1 captured in a state in which the user's hand is held from a lower portion (a right side in the paper surface) to an upper portion (a left side in the paper surface) of the imaging region with respect to a display orientation of the monitor 14 (the left side in the paper surface is an upper side and a right side in the paper surface is a lower side).

The processor 11 detects the middle finger and the orientation of the middle finger shown in the captured image Img1, and cuts out the fingertip region Ar13 including the first joint of the middle finger from the captured image Img1 to generate the first fingertip image. Further, the processor 11 rotates a display angle of the second fingertip image Ex11 in accordance with the display orientation of the monitor 14 (the left side in the paper surface is the upper side and the right side in the paper surface is the lower side) based on the detected orientation of the middle finger.

Further, the processor 11 detects the non-fingertip region Sp11 in which the first fingertip image can be enlarged and displayed in the non-fingertip region of the monitor 14, and enlarges the first fingertip image based on the size of the detected non-fingertip region Sp11. The processor 11 superimposes the rotated and enlarged second fingertip image Ex11 on the captured image Img1.

Based on the first fingertip image, the processor 11 calculates the evaluation value Scr11 of "90" indicating the degree (likelihood) of focus on the fingerprint of the middle finger shown in the first fingertip image, and further superimposes the evaluation value Scr11 of "90" on the second fingertip image Ex11.

The processor 11 generates the confirmation screen Sc21 in which the detection frame Fr11 indicating the detected fingertip region Ar13, the second fingertip image Ex11, and the evaluation value Scr11 are superimposed on the captured image Img1 captured by the camera 13, and outputs the confirmation screen Sc21 to the monitor 14 to display the confirmation screen Sc21 thereon.

<Display Example 2>

The second fingertip image Ex12 illustrated in a display example 2 is an image generated based on the captured image Img2 captured in a state in which the user's hand is held from the upper portion (the left side in the paper surface) to the lower portion (the right side in the paper surface) of the imaging region with respect to the display orientation of the monitor 14 (the left side in the paper surface is the upper side and the right side in the paper surface is the lower side).

The processor 11 detects the middle finger and the orientation of the middle finger shown in the captured image Img2, and cuts out the fingertip region Ar23 including the first joint of the middle finger from the captured image Img2 to generate the first fingertip image. Further, the processor 11 rotates the display angle of the second fingertip image Ex12 by about 180° based on the detected orientation of the middle finger and the display orientation of the monitor 14 (the left side in the paper surface is the upper side and the right side in the paper surface is the lower side).

Further, the processor 11 detects a non-fingertip region Sp12 in which the first fingertip image can be enlarged and displayed in the non-fingertip region of the monitor 14, and enlarges the first fingertip image based on the size of the detected non-fingertip region Sp12. The processor 11 superimposes the rotated and enlarged second fingertip image Ex12 on the captured image Img2.

The processor 11 calculates the evaluation value Scr12 of “90” based on the first fingertip image and further superimposes the evaluation value Scr12 on the second fingertip image Ex12.

The processor 11 generates a confirmation screen Sc22 in which a detection frame Fr12 indicating the detected fingertip region Ar23, the second fingertip image Ex12, and the evaluation value Scr12 are superimposed on the captured image Img2 captured by the camera 13, and outputs the confirmation screen Sc22 to the monitor 14 to display the confirmation screen Sc22 thereon.

<Display Example 3>

The second fingertip image Ex13 illustrated in a display example 3 is an image generated based on a captured image Img3 captured in a state in which the user’s hand is held from the left side (the lower side in the paper surface) to the right side (the upper side in the paper surface) of the imaging region with respect to the display orientation of the monitor 14 (the left side in the paper surface is the upper side and the right side in the paper surface is the lower side).

The processor 11 detects the middle finger and the orientation of the middle finger shown in the captured image Img3, and cuts out a fingertip region Ar33 including the first joint of the middle finger from the captured image Img3 to generate the first fingertip image. Further, the processor 11 rotates the display angle of the second fingertip image Ex13 counterclockwise by about 90° or clockwise by about 270° based on the detected orientation of the middle finger and the display orientation of the monitor 14 (the left side in the paper surface is the upper side and the right side in the paper surface is the lower side).

Further, the processor 11 detects a non-fingertip region Sp13 in which the first fingertip image can be enlarged and displayed in the non-fingertip region of the monitor 14, and enlarges the first fingertip image based on the size of the detected non-fingertip region Sp13. The processor 11 superimposes the rotated and enlarged second fingertip image Ex13 on the captured image Img3.

The processor 11 calculates the evaluation value Scr13 of “90” based on the first fingertip image and further superimposes the evaluation value Scr13 on the second fingertip image Ex13.

The processor 11 generates a confirmation screen Sc23 in which a detection frame Fr13 indicating the detected fingertip region Ar33, the second fingertip image Ex13, and the evaluation value Scr13 are superimposed on the captured image Img3 captured by the camera 13, and outputs the confirmation screen Sc23 to the monitor 14 to display the confirmation screen Sc23 thereon.

<Display Example 4>

The second fingertip image Ex14 illustrated in a display example 4 is an image generated based on a captured image Img4 captured in a state in which the user’s hand is held from the lower side (the right side in the paper surface) to the upper side (the left side in the paper surface) of the imaging region with respect to the display orientation of the monitor 14 (the left side in the paper surface is the upper side and the right side in the paper surface is the lower side). The terminal device 1 in the display example 4 is in a state in which the orientation of the terminal device 1 illustrated in the display examples 1 to 3 is rotated clockwise by 90°, and the display orientation of the monitor 14 is changed to a horizontal orientation in accordance with the rotation of the terminal device 1.

The processor 11 detects the middle finger and the orientation of the middle finger shown in the captured image Img4, and cuts out a fingertip region Ar43 including the first joint of the middle finger from the captured image Img4 to generate the first fingertip image. Further, the processor 11 rotates the display angle of the second fingertip image Ex14 based on the detected orientation of the middle finger and the display orientation of the monitor 14 (the left side in the paper surface is the upper side and the right side in the paper surface is the lower side).

In the non-fingertip region of the monitor 14, the processor 11 enlarges the first fingertip image based on the size of the fingertip image display region Sp14A set in advance or the magnification of the first fingertip image set in advance. The fingertip image display region Sp14A is the non-fingertip region.

The processor 11 may detect a non-fingertip region Sp14B from a region that is the non-fingertip region of the monitor 14 and includes the captured image Img4, and enlarge the first fingertip image based on the size of the detected non-fingertip region Sp14B.

The processor 11 calculates the evaluation value Scr14 of “90” based on the first fingertip image and further superimposes the evaluation value Scr14 on the second fingertip image Ex14.

The processor 11 generates a confirmation screen Sc24 in which a detection frame Fr14 indicating the detected fingertip region Ar43, the second fingertip image Ex14, and the evaluation value Scr14 are superimposed on the captured image Img4 captured by the camera 13, and outputs the confirmation screen Sc24 to the monitor 14 to display the confirmation screen Sc24 thereon.

As described above, the terminal device 1 rotates and displays the second fingertip image in accordance with the display orientation of the monitor 14 (that is, a viewing direction of the monitor 14 by the user) regardless of directions of the user’s held fingers. As a result, the terminal device 1 can visualize to the user the fingerprint shown in the second fingertip image in an easily viewable manner.

In addition, for example, when a person (a person who captures the image) other than the user uses the terminal device 1 carried by the user or the photographer to capture an image of the fingertip of the user (person to be captured) held over the terminal device 1, the terminal device 1 can match the display orientation of the monitor 14 with the orientation of the second fingertip image displayed on the monitor 14 by rotating and displaying the second fingertip image in accordance with the display direction of the monitor 14, and thus can more effectively assist the photographer in capturing the fingerprint image. The person who captures the image here may be any person such as an employee of a facility such as a store or an airport in which the fingerprint data is registered, or a relative of the user.

Superimposed positions of the evaluation values Scr11 to Scr14 may not be limited to the second fingertip images Ex11 to Ex14. For example, the evaluation values Scr11 to Scr14 may be displayed in the non-fingertip region.

Figure 5:
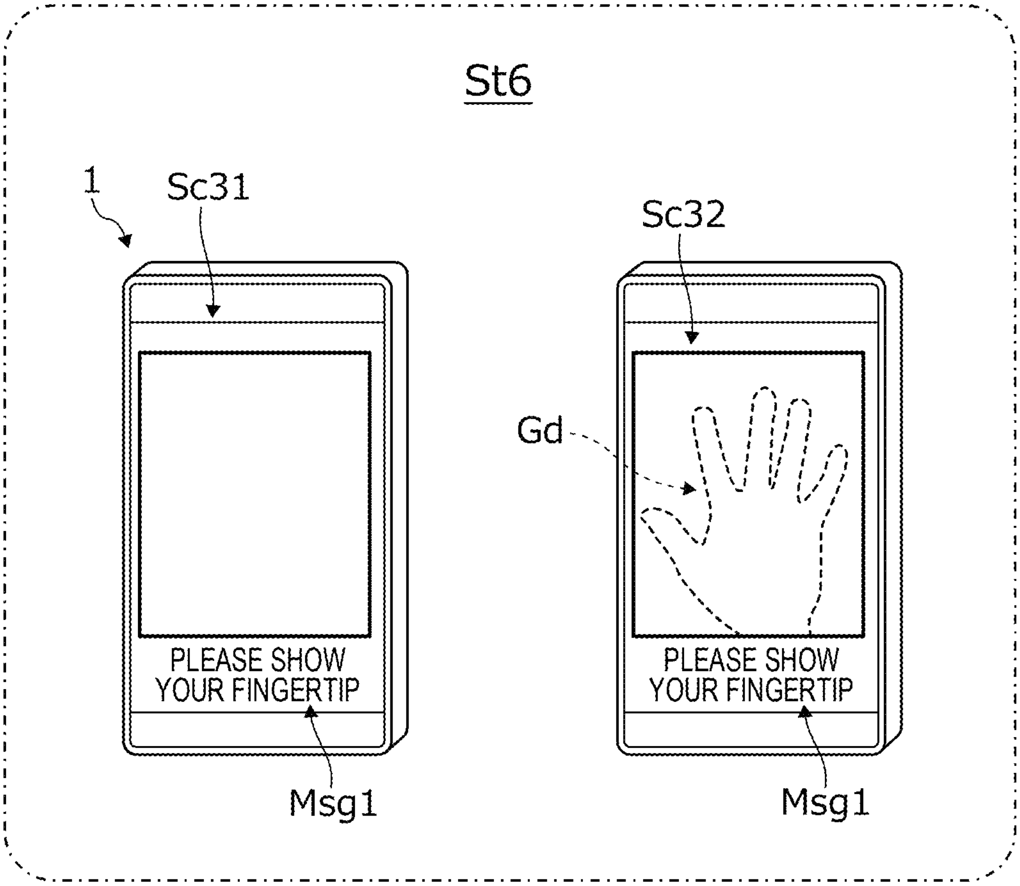
FIG. 5 is a diagram illustrating an alert screen example.

Next, an example of alert screens Sc31 and Sc32 will be described with reference to FIG. 5. FIG. 5 is a diagram illustrating an example of the alert screens Sc31 and Sc32. It is needless to say that shapes of the message Msg1 and a guide Gd included on the alert screens Sc31 and Sc32 illustrated in FIG. 5 are not limited thereto.

When it is determined in the processing of step St3 that the fingertip of the user is not detected from the captured image or the orientation of the fingertip is not detected from the captured image, the processor 11 generates the alert screens Sc31 and Sc32 and outputs the alert screens Sc31 and Sc32 to the monitor 14 to display the alert screens Sc31 and Sc32 thereon.

The alert screen Sc31 is generated to include the message Msg1 "Please show your fingertip" requesting the user to hold the fingertip in the imaging region of the camera 13.

The alert screen Sc32 is generated to include the message Msg1 "Please show your fingertip" requesting the user to hold the fingertip in the imaging region of the camera 13 and the guide Gd for guiding the user's hand into the imaging region of the camera 13.

Figure 6:
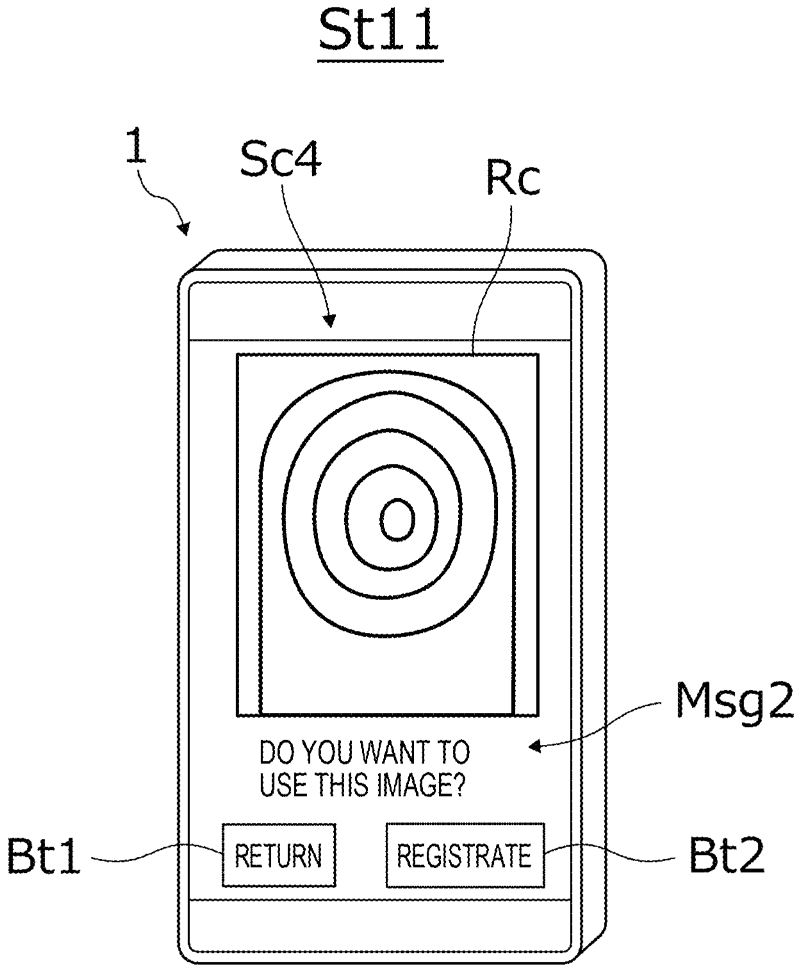
FIG. 6 is a diagram illustrating a registration screen example.

Next, an example of the registration screen Sc4 will be described with reference to FIG. 6. FIG. 6 is a diagram illustrating an example of the registration screen Sc4. It is needless to say that the message Msg2 included in the registration screen Sc4 illustrated in FIG. 6 is not limited thereto. For example, the message Msg2 may be a message such as "Do you want to register with this image?".

When it is determined in the processing of step St10 that the calculated evaluation value is equal to or greater than the threshold value, the processor 11 generates the registration screen Sc4 and outputs the registration screen Sc4 to the monitor 14 to display the registration screen Sc4 thereon.

The registration screen Sc4 includes the first fingertip image Rc for which it is determined that the calculated evaluation value is equal to or greater than the threshold value, and the message Msg2 "Do you want to use this image?" asking the user whether the first fingertip image Rc is used for acquiring and registering the fingerprint data, the return button Bt1, and the registration button Bt2.

Modification 1 of Embodiment 1

An example in which the terminal device 1 according to Embodiment 1 acquires the fingerprint data of any one fingertip of one or more fingertips shown in the captured image has been described. An example in which the terminal device 1 according to Modification 1 of Embodiment 1 acquires fingerprint data of a plurality of fingertips shown in the captured image will be described.

An internal configuration example of each of the fingerprint registration system 100 and the terminal device 1, the server 2, and the biometric authentication device 3 constituting the fingerprint registration system 100 according to Modification 1 of Embodiment 1 has the same configuration as an internal configuration of each of the fingerprint registration system 100 and the terminal device 1, the server 2, and the biometric authentication device 3 constituting the fingerprint registration system 100 according to Embodiment 1. Therefore, in the following description of the fingerprint registration system 100 according to Modification 1 of Embodiment 1, the same components are denoted by the same reference numerals, the description thereof will be omitted, and different functions realized by the respective components will be described.

The processor 11 according to Modification 1 of Embodiment 1 acquires the first fingertip image of each of a predetermined number (for example, two or more and five or less) of fingertips set in advance, extracts the feature of the fingerprint of the fingertip based on each of the acquired predetermined number of first fingertip images, and generates the fingerprint data of the predetermined number of fingertips. The fingerprint data may be the first fingertip image itself. Hereinafter, functions realized by the processor 11 according to Modification 1 of Embodiment 1 will be described with reference to the confirmation screen Sc21 illustrated in FIG. 4.

The processor 11 detects at least one fingertip and the orientation of the fingertip from the captured image Img1, and superimposes the detection frames Fr01, Fr02, Fr03, Fr04, and Fr05 (see FIG. 4) on all the detected fingertips.

Here, the captured image Img1 illustrated in FIG. 4 illustrates an example in which the detection frame Fr01 is superimposed on the thumb, the detection frame Fr02 is superimposed on the index finger, the detection frame Fr03 is superimposed on the middle finger, the detection frame Fr04 is superimposed on the ring finger, and the detection frame Fr05 is superimposed on the little finger along the directions of the detected fingertips. In the processing of detecting the fingertip (the region from the tip of the finger to the first joint) and the orientation of the fingertip in step St3, the processor 11 may omit the superimposition of the detection frame on at least one fingertip that cannot be detected.

First, acquisition of a first fingertip image on a first sheet will be described. The processor 11 highlights only the detection frame superimposed on the fingertip corresponding to the fingertip shown in the second fingertip image Ex11 among the detected fingertips. For example, when the first fingertip image on the first sheet is acquired from the middle finger, the processor 11 highlights only the detection frame Fr11 superimposed on the middle finger among the detected fingers.

The processor 11 generates the first fingertip image, calculates the evaluation value Scr11, and determines whether the evaluation value Scr11 of the first fingertip image is equal to or greater than the threshold value. When it is determined that the evaluation value Scr11 of the first fingertip image is equal to or greater than the threshold value, the processor 11 records the first fingertip image and finger information indicating that the finger shown in the first fingertip image is the middle finger in the memory 12 in association with each other. After acquiring and storing the first fingertip image on the first sheet, the processor 11 ends the highlighting of the detection frame Fr11 superimposed on the middle finger and changes the detection frame Fr11 to the normal detection frame Fr03.

The processor 11 may change the detection frame Fr03 of the fingertip for which the first fingertip image (the fingerprint data) has been acquired to a line type indicating that the first fingertip image (the fingerprint data) has been acquired. For example, the processor 11 may change the detection frame Fr03 of the fingertip for which the first fingertip image (the fingerprint data) has been acquired to a broken line, display the detection frame Fr03 in a predetermined color (for example, blue, gray, or the like), or reduce the thickness of the line. The processor 11 may hide the detection frame Fr03 of the fingertip for which the first fingertip image (the fingerprint data) has been acquired. Accordingly, the terminal device 1 visualize to the user the fingertip for which the acquisition of the first fingertip image has been completed and the fingertip for which the acquisition of the first fingertip image has not been completed.

Next, acquisition of a first fingertip image on a second sheet will be described. The processor 11 highlights only the detection frame superimposed on any one fingertip of the detected fingers for which the first fingertip image has not been acquired. For example, when the first fingertip image on the second sheet is acquired from the index finger, the processor 11 highlights only the detection frame Fr02 superimposed on the index finger among the detected fingertips.

The processor 11 generates the first fingertip image corresponding to the index finger, calculates the evaluation value, and determines whether the evaluation value of the first fingertip image of the index finger is equal to or greater than the threshold value. When it is determined that the evaluation value of the first fingertip image of the index finger is equal to or greater than the threshold value, the processor 11 records the first fingertip image (that is, the first fingertip image on the second sheet) of the index finger and the finger information indicating that the fingertip shown in the first fingertip image is the index finger in the memory 12 in association with each other. After acquiring and storing the first fingertip image on the second sheet, the processor 11 ends the highlighting of the detection frame Fr02 superimposed on the index finger.

The processor 11 repeatedly performs the above processing, and when it is determined that the acquisition of the first fingertip image of each of the predetermined number of fingers has been completed, the processor 11 extracts the feature of the fingerprint of the fingertip based on each of the first fingertip images stored in the memory 12. The processing of extracting the feature of the fingerprint may be performed by the server 2. The processor 11 transmits the generated fingerprint data (the first fingertip image or the feature of the fingerprint), the finger information corresponding to the fingerprint data, and the user information to the server 2 in association with each other.

In Modification 1 of Embodiment 1, the predetermined number of fingertips that are fingerprint data acquisition (registration) targets may be designated (set) in advance, for example, two fingertips of the middle finger and the index finger, three fingertips of the middle finger, the index finger, and the ring finger, and the like.

Figure 7:
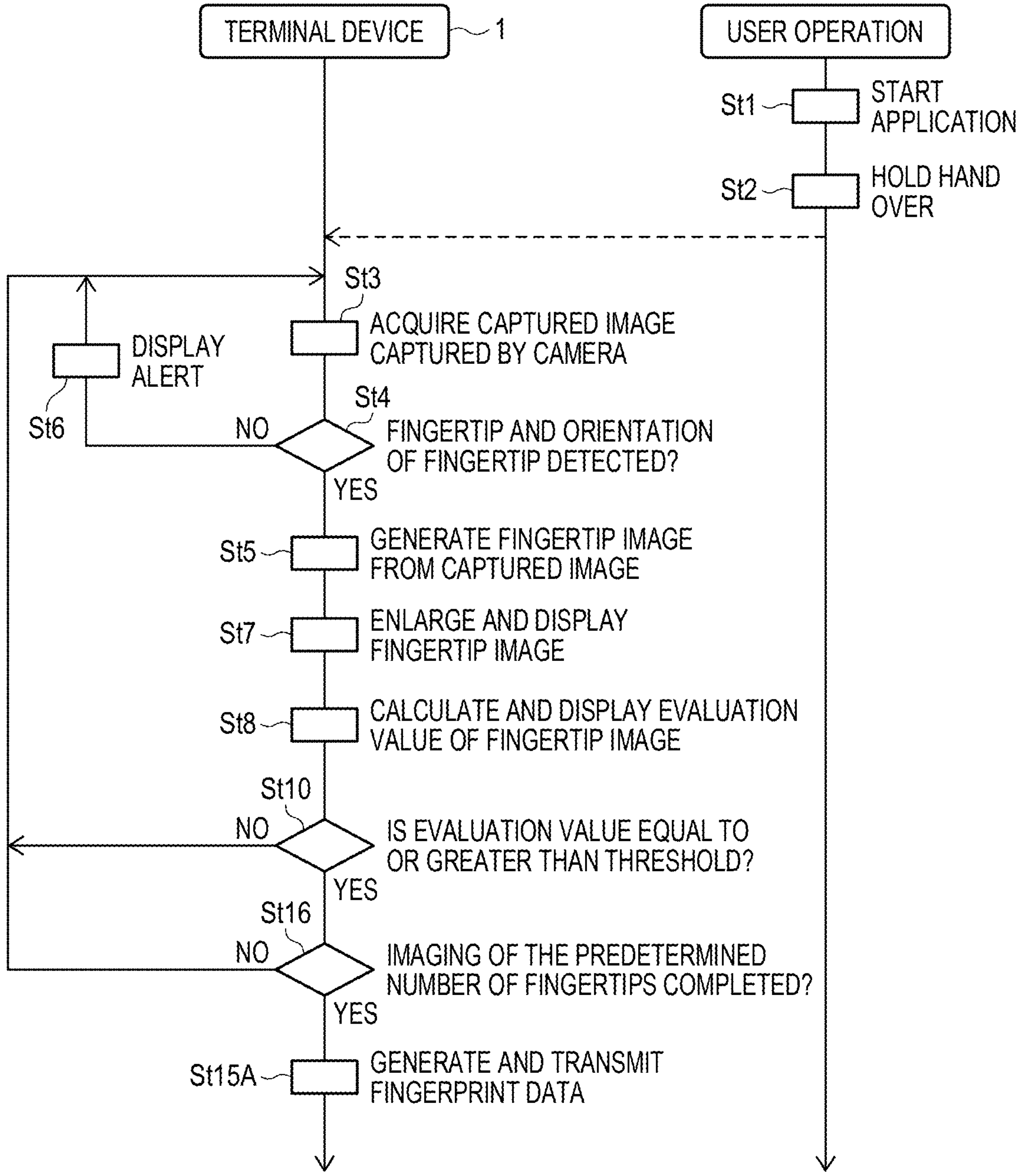
FIG. 7 is a sequence diagram illustrating an operation procedure and an operational procedure example of a terminal device according to Modification 1 of Embodiment 1.

Next, an operational procedure example of the terminal device 1 according to Modification 1 of Embodiment 1 will be described with reference to FIG. 7. FIG. 7 is a sequence diagram illustrating an operation procedure and the operational procedure example of terminal device 1 according to Modification 1 of Embodiment 1.

The processing of step St1 to step St8 and step St10 illustrated in FIG. 7 are the same as the processing of step St1 to step St8 and step St10 illustrated in FIG. 3, and thus the description thereof will be omitted. Further, in FIG. 7, illustration of each of step St9 and step St11 to step St14 is omitted, but these processing may be performed without being omitted.

When it is determined in the processing of step St10 that the calculated evaluation value of the first fingertip image is equal to or greater than the threshold value (St10, YES), the processor 11 records the first fingertip image having the evaluation value equal to or greater than the threshold value and the finger information (for example, the middle finger) shown in the first fingertip image in the memory 12 in association with each other. The finger information may further include information indicating whether the finger is of a right hand or a left hand.

The processor 11 determines whether imaging of a predetermined number of fingertips set in advance (that is, acquisition of the first fingertip image of each of the predetermined number of fingertips) has been completed (St16).

When it is determined in the processing of step St16 that the imaging of the predetermined number of fingertips set in advance has been completed (St16, YES), the processor 11 extracts the feature of the fingerprint of each fingertip and generates the fingerprint data of the predetermined number of fingertips (St15A). The processor 11 transmits the generated fingerprint data, the finger information in which the fingerprint data is generated, and the user information to the server 2 in association with each other (St15A).

When it is determined in the processing of step St16 that the imaging of the predetermined number of fingertips set in advance has not been completed (St16, NO), the processor 11 returns to the processing of step St3.

As described above, the terminal device 1 according to Modification 1 of Embodiment 1 can acquire each of the first fingertip images of the predetermined number (plurality) of fingertips, and extract the features of the plurality of fingertips based on each of the acquired first fingertip images.

Modification 2 of Embodiment 1

An example in which the terminal device 1 according to Modification 1 of Embodiment 1 acquires the fingerprint data of a plurality of fingertips shown in the captured image has been described. An example in which the terminal device 1 according to Modification 2 of Embodiment 1 acquires fingerprint data of a plurality of fingertips from both hands will be described.

The internal configuration example of each of the fingerprint registration system 100 and the terminal device 1, the server 2, and the biometric authentication device 3 constituting the fingerprint registration system 100 according to Modification 2 of Embodiment 1 has the same configuration as the internal configuration of each of the fingerprint registration system 100 and the terminal device 1, the server 2, and the biometric authentication device 3 constituting the fingerprint registration system 100 according to Embodiment 1 and Modification 1 of Embodiment 1. Therefore, in the following description of the fingerprint registration system 100 according to Modification 2 of Embodiment 1, the same components are denoted by the same reference numerals, the description thereof will be omitted, and different functions realized by the respective components will be described.

The processor 11 according to Modification 2 of Embodiment 1 captures an image of each of the right hand and the left hand, and acquires the first fingertip images of a predetermined number of fingertips using a captured image of the right hand and a captured image of the left hand. The processor 11 extracts features of fingerprints of the predetermined number of fingertips of each of the right hand and the left hand based on the acquired predetermined number of first fingertip images, and generates fingerprint data. The fingerprint data may be the first fingertip image itself. Hereinafter, functions realized by the processor 11 according to Modification 2 of Embodiment 1 will be described.

The processor 11 detects at least one fingertip and the orientation of the fingertip from the captured image, and superimposes the detection frame on each of all the detected fingertips. The processor 11 detects whether the hand shown in the captured image is the right hand or the left hand, and determines whether the detected hand is one designated hand (that is, the right hand or the left hand).

When it is determined that the detected hand is the one designated hand (that is, the right hand or the left hand), the processor 11 performs the same processing as that of the processor 11 in Modification 1 of Embodiment 1, and generates and acquires the first fingertip image for which the evaluation value is equal to or greater than the threshold value for each of the predetermined number of fingertips. The processor 11 records each of the plurality of acquired first fingertip images, and the hand information and the finger information corresponding to the first fingertip images in the memory 12 in association with each other. Note that the hand information here is information indicating whether the fingertip shown in the first fingertip image is the fingertip of the right hand or the fingertip of the left hand.

The processor 11 detects at least one fingertip and the orientation of the fingertip from the captured image, and superimposes the detection frame on each of all the detected fingertips. The processor 11 detects whether the hand shown in the captured image is the right hand or the left hand, and determines whether the detected hand is the other designated hand (that is, the right hand or the left hand).

When it is determined that the detected hand is the other designated hand (that is, the right hand or the left hand), the processor 11 performs the same processing as that of the processor 11 in Modification 1 of Embodiment 1, and generates and acquires the first fingertip image for which the evaluation value is equal to or greater than the threshold value for each of the predetermined number of fingertips. The processor 11 records each of the plurality of acquired first fingertip images, and the hand information and the finger information corresponding to the first fingertip images in the memory 12 in association with each other.

The processor 11 determines whether the capturing of the first fingertip images for the predetermined number of fingers on each of both hands has been completed with reference to the memory 12. When it is determined that the capturing of the first fingertip images for the predetermined number of fingers on both hands has been completed, the processor 11 extracts the feature of the fingerprint of each fingertip based on each of the first fingertip images stored in the memory 12, and generates the fingerprint data. The processor 11 transmits the generated fingerprint data, the hand information and the finger information corresponding to the fingerprint data, and the user information to the server 2 in association with each other.

In Modification 2 of Embodiment 1, the predetermined number of fingertips that are fingerprint data acquisition (registration) targets may be designated (set) in advance, for example, two fingertips of the middle finger and the index finger, three fingertips of the middle finger, the index finger, and the ring finger, and the like.

In Modification 2 of Embodiment 1, the fingertips from which the fingerprint data is acquired are preferably the same for the right hand and the left hand, but the present disclosure is not limited thereto. For example, the fingertips from which the fingerprint data is acquired may be different, such as the middle finger and ring finger on the right hand, and the middle finger and index finger on the left hand.

Figure 8:
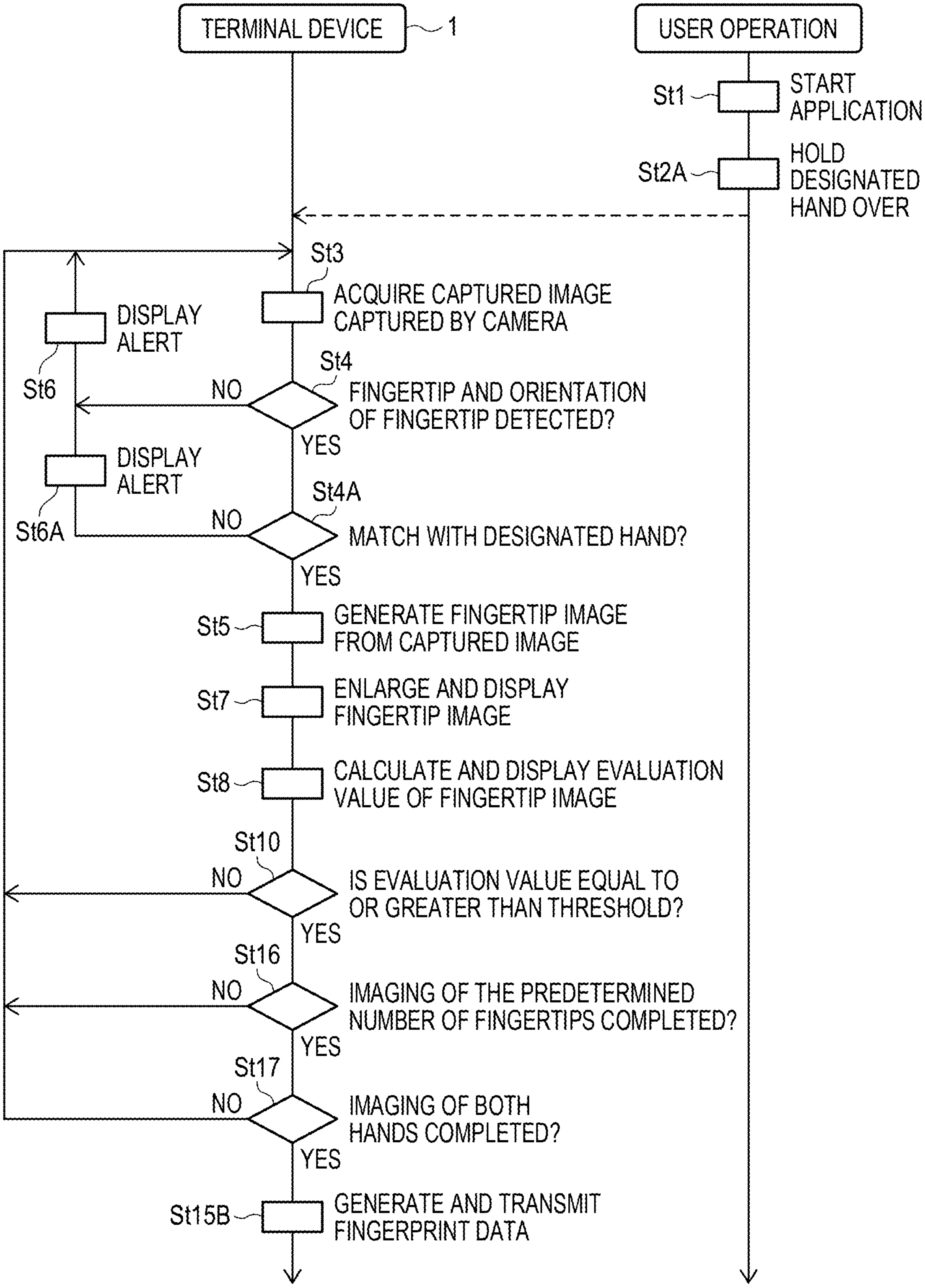
FIG. 8 is a sequence diagram illustrating an operation procedure and an operational procedure example of a terminal device according to Modification 2 of Embodiment 1.

Next, an operational procedure example of the terminal device 1 according to modification 2 of Embodiment 1 will be described with reference to FIG. 8. FIG. 8 is a sequence diagram illustrating an operation procedure and the operational procedure example of terminal device 1 according to Modification 2 of Embodiment 1.

The processing of step St1 to step St8 and step St10 illustrated in FIG. 8 are the same as the processing of step St1 to step St8 and step St10 illustrated in FIG. 3, and thus the description thereof will be omitted. The processing of step St16 illustrated in FIG. 8 is the same as the processing of step St16 illustrated in FIG. 7, and thus the description thereof will be omitted.

Further, in the sequence diagram illustrated in FIG. 8, illustration of each of step St9 and step St11 to step St14 is omitted, but these processing may be performed without being omitted.

In acquiring the fingerprint data, the user holds the designated hand (the right hand or the left hand) in the imaging region of the camera 13 (St2A). The designated hand may be determined by an application or may be determined based on a user operation.

The processor 11 performs image analysis on the captured image Img1 and detects the fingertips including at least the first joint and the orientation of each detected fingertip. The processor 11 determines whether at least one fingertip and the orientation of the fingertip have been detected from the captured image Img1 (St4).

When it is determined in the processing of step St4 that at least one fingertip and the orientation of the fingertip have been detected from the captured image Img1 (St4, YES), the processor 11 detects whether the hand shown in the captured image Img1 is the right hand or the left hand. The processor 11 further determines whether the detected hand (the right hand or the left hand) matches the designated hand (the right hand or the left hand) (St4A).

When it is determined in the processing of step St4A that the detected hand (the right hand or the left hand) matches the designated hand (the right hand or the left hand) (St4A, YES), the processor 11 proceeds to the processing of step St5 and generates the first fingertip image of any fingertip shown in the captured image.

On the other hand, when it is determined in the processing of step St4A that the detected hand (the right hand or the left hand) does not match the designated hand (the right hand or the left hand) (St4A, NO), the processor 11 generates an alert screen Sc6 (see FIG. 9) including a message Msg3 requesting imaging of the designated hand, and outputs the alert screen Sc6 to the monitor 14 to display the alert screen Sc6 thereon (St6A). It goes without saying that the content of the message Msg3 may be changed to any content depending on whether the designated hand is the right hand or the left hand.

The processor 11 determines whether imaging of a predetermined number of fingertips set in advance (that is, acquisition of the first fingertip images of the predetermined number of fingertips) on the one hand has been completed (St16).

When it is determined in the processing of step St16 that the imaging of the predetermined number of fingertips set in advance has been completed (St16, YES), the processor 11 stores the hand information indicating whether the fingertip shown in the first fingertip image is of the right hand or the left hand and the finger information indicating which finger the fingertip shown in the first fingertip image is in the memory 12 in association with each of the first fingertip images corresponding to the fingertips.

When it is determined in the processing of step St16 that the imaging of the predetermined number of fingertips set in advance has not been completed (St16, NO), the processor 11 returns to the processing of step St3.

After storing the captured first fingertip image of each of the predetermined number of fingertips in the memory 12, the processor 11 determines whether the imaging of the predetermined number of fingertips set in advance for each of both hands (the right hand and the left hand) has been completed (St17).

When it is determined in the processing of step St17 that the imaging of the predetermined number of fingertips set in advance for each of both hands has been completed (St17, YES), the processor 11 extracts the feature of the fingerprint of each fingertip based on each of the first fingertip images stored in the memory 12, and generates the fingerprint data. The processor 11 transmits the generated fingerprint data, the hand information and the finger information corresponding to the fingerprint data, and the user information to the server 2 in association with each other (St15B).

When it is determined in the processing of step St17 that the imaging of the predetermined number of fingertips set in advance for each of both hands has not been completed (St17, NO), the processor 11 returns to the processing of step St3.

Here, the processor 11 may generate a screen (not illustrated) for notifying that the acquisition (imaging) of the first fingertip image of the designated hand has been completed, display the screen on the monitor 14, and then return to the processing of step St3, or may generate a screen (not illustrated) for instructing to hold the other hand on an opposite side of the hand whose the first fingertip image has been captured (that is, the designated hand), and display the screen on the monitor 14.

As described above, the terminal device 1 according to Modification 2 of Embodiment 1 can acquire the first fingertip images of the predetermined number (plurality) of fingertips for each of the right hand and the left hand, and can generate (acquire) the fingerprint data of the plurality of fingertips for each of the right hand and the left hand based on the acquired first fingertip images.

Figure 9:
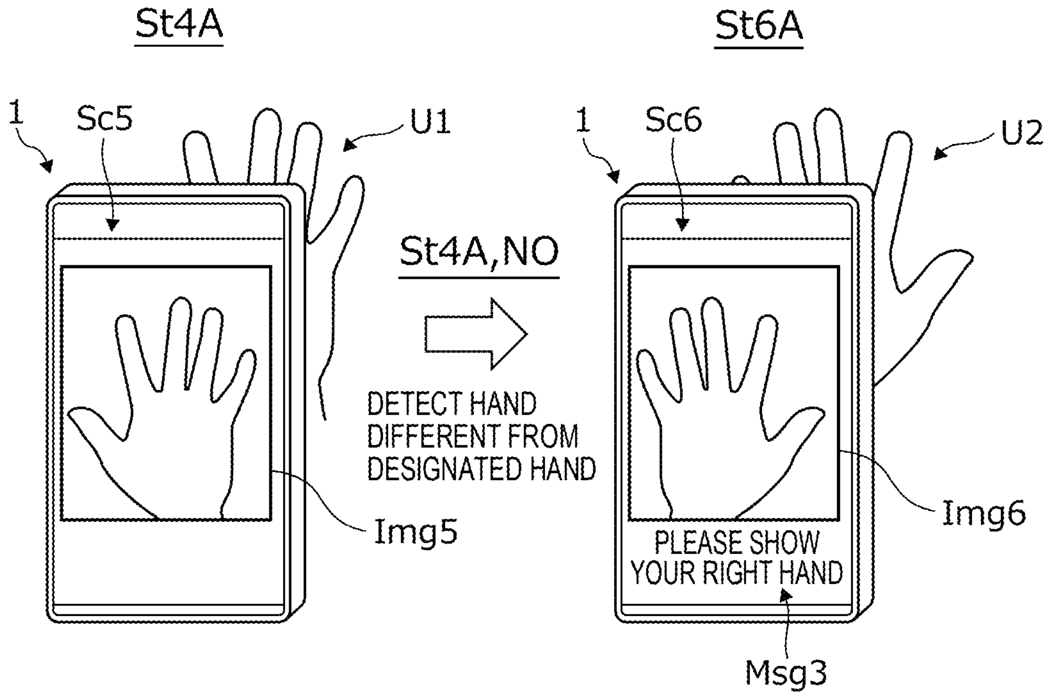
FIG. 9 is a diagram illustrating an alert screen example.

Next, an example of the alert screen Sc6 will be described with reference to FIG. 9. FIG. 9 is a diagram illustrating the example of the alert screen Sc6. It is needless to say that the message Msg3 included in the alert screen Sc6 illustrated in FIG. 9 is not limited thereto. In FIG. 9, an example in which the right hand is designated will be described.

When it is determined in the processing of step St4A that the hand detected from a captured image Img5 does not match the designated hand, the processor 11 generates the alert screen Sc6 including the message Msg3 requesting imaging of the designated hand, and outputs the alert screen Sc6 to the monitor 14 to display the alert screen Sc6 thereon.

For example, in the example illustrated in FIG. 9, the user holds a left hand U1 in the imaging region of the camera 13. The processor 11 performs image analysis on the captured image Img5 captured by the camera 13 and detects the left hand U1 of the user in the captured image Img5. The processor 11 determines that the left hand U1 detected from the captured image Img5 does not match the designated hand (the right hand), generates the alert screen Sc6 including the message Msg3 "Please show your right hand" requesting the user to hold a designated right hand U2 (that is, to capture an image of the right hand), and displays the alert screen Sc6 on the monitor 14.

In addition to the message Msg3, the alert screen Sc6 may be generated to include a guide (not illustrated) having a shape of a designated hand as illustrated in FIG. 5.

Thus, the terminal device 1 can instruct the user to capture an image of the hand which is the acquisition target of the fingerprint data. Therefore, the terminal device 1 can acquire the captured image Img6 obtained by capturing the image of the designated hand (the right hand U2).

Modification 3 of Embodiment 1

The terminal device 1 according to Embodiment 1 and Modification 1 and Modification 2 of Embodiment 1 detects the fingertip from the captured image, cuts out the fingertip region including the first joint of the detected fingertip as it is to generate the first fingertip image, and displays the first fingertip image obtained by enlarging the first fingertip image on the monitor 14. An example in which the terminal device 1 according to Modification 2 of Embodiment 1 displays, on the monitor 14, a fingertip illustration corresponding to the evaluation value of the first fingertip image cut out instead of the first fingertip image will be described.

The internal configuration example of each of the fingerprint registration system 100 and the terminal device 1, the server 2, and the biometric authentication device 3 constituting the fingerprint registration system 100 according to Modification 3 of Embodiment 1 has the same configuration as the internal configuration of each of the fingerprint registration system 100 and the terminal device 1, the server 2, and the biometric authentication device 3 constituting the fingerprint registration system 100 according to Embodiment 1 and Modification 1 and Modification 2 of Embodiment 1. Therefore, in the following description of the fingerprint registration system 100 according to Modification 3 of Embodiment 1, the same components are denoted by the same reference numerals, the description thereof will be omitted, and different functions realized by the respective components will be described.

The processor 11 according to Modification 3 of Embodiment 1 generates confirmation screens Sc71 and Sc72 in which fingertip illustrations Ex71 and Ex72 based on the evaluation values of the generated first fingertip image are superimposed on the non-fingertip region, and displays the confirmation screens Sc71 and Sc72 on the monitor 14, instead of the processing of displaying the enlarged second fingertip image on the monitor 14.

Each of the fingertip illustrations Ex71 and Ex72 is stored in the memory 12 in advance, and is, for example, an illustration imitating a fingertip and a fingerprint of the fingertip. The fingertip illustrations Ex71 and Ex72 have different edge intensities of line drawings or different resolutions of the fingertip illustrations based on calculated evaluation values Scr71 and Scr72.

When it is determined that the calculated evaluation value of the first fingertip image is less than the threshold value, the processor 11 generates the confirmation screen Sc71 (see FIG. 11) including the fingertip illustration Ex71 (see FIG. 11) having a low edge intensity of the line drawing or a low resolution, a captured image Img7, and the calculated evaluation value Scr71, and outputs the confirmation screen Sc71 to the monitor 14 to display the confirmation screen Sc71 thereon.

When it is determined that the calculated evaluation value of the first fingertip image is equal to or greater than the threshold value, the processor 11 generates a confirmation screen Sc72 (see FIG. 11) including the fingertip illustration Ex72 (see FIG. 11) having a high edge intensity of the line drawing or a high resolution, the captured image Img7, and the calculated evaluation value Scr72, and outputs the confirmation screen Sc72 to the monitor 14 to display the confirmation screen Sc72 thereon.

The number of types of fingertip illustrations is not limited to two, and may be three or more. The fingertip illustration may be stored for each finger (the thumb to the little finger).

The fingertip illustration may be displayed with a line drawing or a frame line of a different color corresponding to the evaluation value. For example, when the calculated evaluation value is equal to or greater than the threshold value, the fingertip illustration may be displayed in green, and when the calculated evaluation value is less than the threshold value, the fingertip illustration may be displayed in red. Accordingly, the user can intuitively grasp whether the camera 13 is in focus on the fingerprint of the fingertip based on the color of the line drawing of the fingertip illustration or the frame line of the fingertip illustration.

Figure 10:
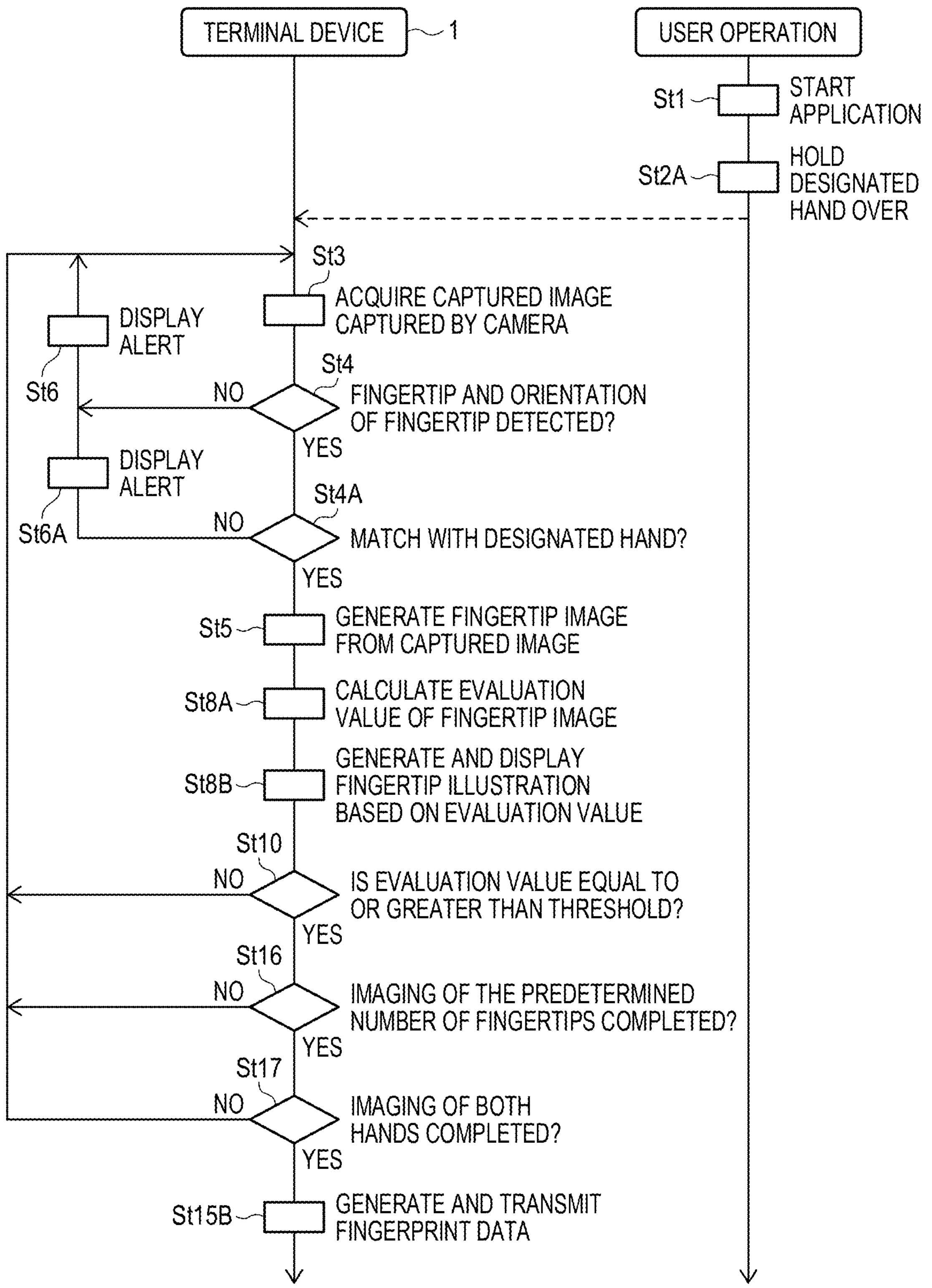
FIG. 10 is a sequence diagram illustrating an operation procedure and an operational procedure example of a terminal device according to Modification 3 of Embodiment 1.

Next, an operational procedure example of the terminal device 1 according to Modification 3 of Embodiment 1 will be described with reference to FIG. 10. FIG. 10 is a sequence diagram illustrating an operation procedure and the operational procedure example of the terminal device 1 according to Modification 3 of Embodiment 1. In the description of FIG. 10, the operation procedure and the operational procedure example of the terminal device 1 will be specifically described with reference to the confirmation screens Sc71 and Sc72 (see FIG. 11).

Since the processing illustrated in FIG. 10 is the same as the processing illustrated in FIG. 8 except for the processing of step St8A to step St8B, the description of the same processing will be omitted. Further, in the sequence diagram illustrated in FIG. 10, illustration of each of step St9 and step St11 to step St14 is omitted, but these processing may be performed without being omitted.

The processor 11 cuts out a fingertip region of one fingertip including at least the first joint from the captured image Img7 to generate the first fingertip image (not illustrated) (St5).

Based on the generated first fingertip image, the processor 11 calculates the evaluation values Scr71 and Scr72 indicating the degree (likelihood) of focusing on the fingerprint shown in the first fingertip image (St8A).

The processor 11 acquires the fingertip illustrations Ex71 and Ex72 corresponding to the calculated evaluation values Scr71 and Scr72 from the memory 12. The processor 11 rotates the acquired fingertip illustrations Ex71 and Ex72 based on a gravity direction applied to the terminal device 1, and then enlarges the fingertip illustrations Ex71 and Ex72 based on the size of the non-fingertip region. The processor 11 generates the confirmation screens Sc71 and Sc72 (see FIG. 11) including the captured images Img7, the rotated and enlarged fingertip illustrations Ex71 and Ex72, and the calculated evaluation values Scr71 and Scr72, and outputs the confirmation screens Sc71 and Sc72 to the monitor 14 to display the confirmation screens Sc71 and Sc72 thereon (St8B).

Note that, similarly to the terminal device 1 according to Embodiment 1, the terminal device 1 according to Modification 3 of Embodiment 1 may acquire the first fingertip image of at least one fingertip of the right hand or the left hand with the evaluation value equal to or greater than the threshold value. When acquiring the first fingertip image of at least one fingertip of the right hand or the left hand, the terminal device 1 according to Modification 3 of Embodiment 1 may omit the processing of step St4A, step St6A, step St16, and step St17. In step St15B, the processing of step St15 may be performed.

As described above, the terminal device 1 according to Modification 3 of Embodiment 1 does not enlarge and display the first fingertip image obtained by cutting out the fingertip region including the first joint of the detected fingertip as it is, so that it is possible to prevent theft of the enlarged and displayed first fingertip image (for example, theft by taking a secret photograph of the first fingertip image) by a third party positioned in the vicinity of the user or a person (the person who captures the image) other than the user, and to prevent leakage of biometric information of the user.

Figure 11:
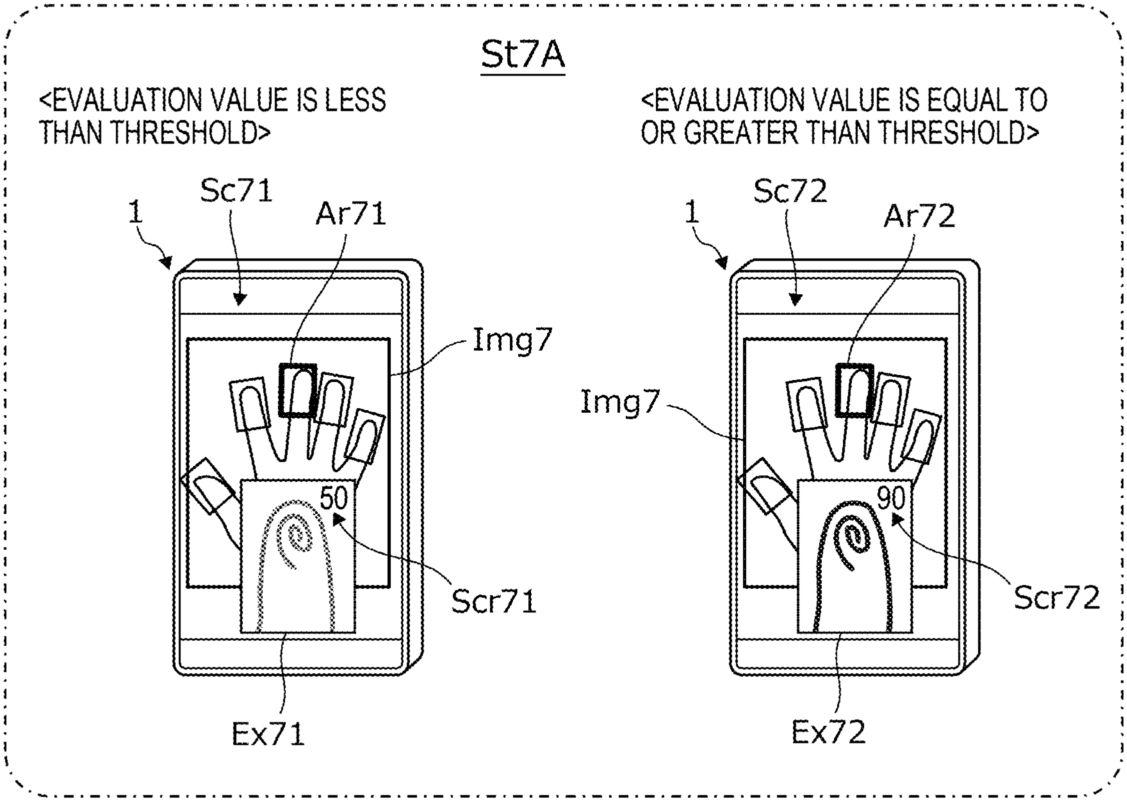
FIG. 11 is a diagram illustrating a confirmation screen example.

Next, an example of the confirmation screens Sc71 and Sc72 using the fingertip illustrations Ex71 and Ex72 will be described with reference to FIG. 11. FIG. 11 is a diagram illustrating examples of the confirmation screens Sc71 and Sc72. It is needless to say that the fingertip illustrations Ex71 and Ex72 illustrated in FIG. 11 are merely examples and are not limited thereto.

When it is determined that the calculated evaluation value is less than the threshold value, the processor 11 generates the confirmation screen Sc71 and outputs the confirmation screen Sc71 to the monitor 14 to display the confirmation screen Sc71 thereon. When it is determined that the calculated evaluation value is equal to or greater than the threshold value, the processor 11 generates the confirmation screen Sc72 and outputs the confirmation screen Sc72 to the monitor 14 to display the confirmation screen Sc72 thereon.

The confirmation screen Sc71 includes the captured image Img7 on which detection frames superimposed on the detected fingertip regions of the respective fingers are superimposed, the evaluation value Scr71, and the fingertip illustration Ex71 corresponding to the evaluation value Scr71. The fingertip illustration Ex71 is an image for allowing the user to intuitively grasp that the captured image Img7 is an image in which the fingerprint of the fingertip is not in focus and which is not suitable for acquiring the fingerprint data, and is an out-of-focus image in which the edge intensity of the line drawing of the illustration is low or the resolution thereof is low.

The confirmation screen Sc72 includes the captured image Img7 on which the detection frames superimposed on the detected fingertip regions of the respective fingers are superimposed, the evaluation value Scr72, and the fingertip illustration Ex72 corresponding to the evaluation value Scr72. The fingertip illustration Ex72 is an image for allowing the user to intuitively grasp that the captured image Img7 is an image in which the fingerprint of the fingertip is in focus and which is suitable for acquiring fingerprint data, and is an image in which the edge intensity of the line drawing of the illustration is high or the resolution thereof is high.

As described above, the terminal device 1 according to Modification 3 of Embodiment 1 can allow the user to intuitively grasp whether the captured image Img7 is a captured image in which the fingerprint of the fingertip is in focus without using the first fingertip image generated by directly cutting out the fingertip region including the first joint of the detected fingertip.

As described above, the terminal device 1 (an example of the biometric information acquisition assistance device) according to Embodiment 1 and Modification 1 to Modification 3 of Embodiment 1 includes the communication unit 10 (an example of the acquisition unit) configured to acquire the captured image of at least one fingertip captured in the contactless state, the processor 11 (an example of the detection unit) configured to detect the at least one fingertip shown in the captured image Img1, the processor 11 (an example of the generation unit) configured to generate the first fingertip image obtained by cutting out the fingertip region (for example, the fingertip region Ar13) including the detected fingertip, and the processor 11 (an example of the control unit) configured to generate the confirmation screen Sc21 (an example of the biometric information acquisition screen) including the captured image Img1 and the second fingertip image Ex11 disposed outside a first region including the fingertip region (the fingertip region Ar13) of the fingertip and obtained by enlarging the first fingertip image, and output the confirmation screen Sc21 to the monitor 14.

Accordingly, the terminal device 1 according to Embodiment 1 and Modification 1 to Modification 3 of Embodiment 1 can intuitively grasp whether the camera 13 is in focus on the fingerprint of the fingertip by the second fingertip image Ex11 obtained by enlarging the fingertip that is the acquisition target of the fingerprint data (that is, the biometric information). Further, the terminal device 1 can easily assist the user in adjusting the position of the hand to be held while checking the state of the fingertip by the second fingertip image Ex11 included on the output confirmation screen Sc21. Therefore, the terminal device 1 can assist in acquisition (imaging) of fingerprint data more suitable for the fingerprint authentication even in the contactless state.

The processor 11 of the terminal device 1 according to Embodiment 1 and Modification 1 to Modification 3 of Embodiment 1 further detects the orientation of the fingertip shown in the captured image Img1. The processor 11 rotates the orientation of the second fingertip image Ex11 (that is, the fingertip) displayed on the monitor 14 to a predetermined orientation (for example, the display direction of the monitor 14, the gravity direction of the terminal device 1, or the like), and displays the confirmation screen Sc21 including the rotated second fingertip image Ex11. Accordingly, the terminal device 1 according to Embodiment 1 and Modification 1 to Modification 3 of Embodiment 1 can assist the user in confirming whether the fingerprint is in focus by displaying the second fingertip image Ex11 shown on the monitor 14 such that the display orientation of the second fingertip image Ex11 is constant regardless of the direction of the hand and each finger of the user held over the terminal device 1. Therefore, the terminal device 1 can assist in acquisition (imaging) of fingerprint data more suitable for the fingerprint authentication even in the contactless state.

The terminal device 1 according to Embodiment 1 and Modification 1 to Modification 3 of Embodiment 1 further includes the sensor 16 configured to detect the gravity direction of the terminal device 1. The predetermined orientation is the orientation of the gravity direction. Accordingly, the terminal device 1 according to Embodiment 1 and Modification 1 to Modification 3 of Embodiment 1 can assist the user in confirming whether the fingerprint is in focus by rotating and displaying the second fingertip image Ex11 in accordance with the display orientation (that is, the gravity direction) of the monitor 14 regardless of the direction of the hand and each finger of the user held over the terminal device 1. Therefore, the terminal device 1 can assist in acquisition (imaging) of fingerprint data more suitable for the fingerprint authentication even in the contactless state.

On the confirmation screen Sc24 of the terminal device 1 according to Embodiment 1 and Modification 1 to Modification 3 of Embodiment 1, short sides of the captured image Img4 and the second fingertip image Ex14 each having a substantially rectangular shape are each disposed parallel to a long side direction of the monitor 14 having a substantially rectangular shape. Accordingly, as illustrated in "Display Example 4" of FIG. 4, when the long side direction of the monitor 14 and the gravity direction applied to the terminal device 1 are orthogonal to each other and the monitor 14 displays an image in the horizontal orientation, the captured image Img4 and the second fingertip image Ex14 are arranged side by side, so that the terminal device 1 can display the first fingertip image in a larger size.

On the confirmation screen Sc24 of the terminal device 1 according to Embodiment 1 and Modification 1 to Modification 3 of Embodiment 1, the second fingertip image Ex14 is not superimposed on the captured image Img4. Accordingly, in the terminal device 1 according to Embodiment 1 and Modification 1 to Modification 3 of Embodiment 1, when the monitor 14 displays the image in the horizontal orientation, the captured image Img4 and the second fingertip image Ex14 can effectively use the displayable region of the monitor 14.

The processor 11 of the terminal device 1 according to Embodiment 1 and Modification 1 to Modification 3 of Embodiment 1 determines the magnification of the first fingertip image based on the size outside the first region (the fingertip region Ar13) in the display region of the monitor 14. As a result, the terminal device 1 according to Embodiment 1 and Modification 1 to Modification 3 of Embodiment 1 can visualize to the user an imaging state of the fingertip that is the acquisition target of the fingerprint data in each of the captured image Img1 and the enlarged second fingertip image Ex11, and enlarge and display the first fingertip image to a size displayable outside the fingertip region Ar13 corresponding to the fingertip that is the acquisition target of the fingerprint data.

The processor 11 of the terminal device 1 according to Embodiment 1 and Modification 1 to Modification 3 of Embodiment 1 determines the magnification of the first fingertip image based on the size of the non-fingertip region Sp11, which is outside the first region (for example, the fingertip region Ar13) in the display region of the monitor 14 and has a magnification of one times or more of the magnification of the first fingertip image, and generates the confirmation screen Sc21 on which the second fingertip image Ex11 is disposed in the non-fingertip region Sp11. As a result, the terminal device 1 according to Embodiment 1 and Modification 1 to Modification 3 of Embodiment 1 can visualize to the user the imaging state of the fingertip that is the acquisition target of the fingerprint data in each of the captured image Img1 and the enlarged second fingertip image Ex11, and can enlarge and display the second fingertip image Ex11 to a size displayable outside the fingertip region Ar13 corresponding to the fingertip that is the acquisition target of the fingerprint data.

The first region of the terminal device 1 according to Embodiment 1 and Modification 1 to Modification 3 of Embodiment 1 includes the fingertip regions Ar11 to Ar15 of all the fingertips detected by the processor 11. As a result, the terminal device 1 according to Embodiment 1 and Modification 1 to Modification 3 of Embodiment 1 can visualize to the user the imaging state of each fingertip detected in each of the captured image Img1 and the enlarged second fingertip image Ex11, and enlarge and display the first fingertip image to a size display able outside the fingertip regions Ar11 to Ar15 of all the detected fingertips.

The processor 11 of the terminal device 1 according to Embodiment 1 and Modification 1 to Modification 3 of Embodiment 1 superimposes the detection frame Fr03 indicating the fingertip region Ar13 of the fingertip corresponding to the second fingertip image Ex11 among the fingertips shown in the captured image Img1. Accordingly, the terminal device 1 according to Embodiment 1 and Modification 1 to Modification 3 of Embodiment 1 can visualize to the user the fingertip shown in the second fingertip image Ex11.

The processor 11 of the terminal device 1 according to Embodiment 1 and Modification 1 to Modification 3 of Embodiment 1 superimposes the detection frames Fr01 to Fr05 (examples of frame lines) indicating the fingertip regions Ar11 to Ar15 of the plurality of fingertips shown in the detected captured image, and highlights the detection frame Fr03 corresponding to the second fingertip image Ex11 among the plurality of superimposed detection frames Fr01 to Fr05 (for example, the detection frame Fr11). As a result, the terminal device 1 according to Embodiment 1 and Modification 1 to Modification 3 of Embodiment 1 visualizes to the user a detection state (detection/non-detection) of each of the fingertips shown in the captured image Img1 by displaying the detection frames Fr01 to Fr05, and highlights the detection frame Fr03 corresponding to the fingertip shown in the second fingertip image Ex11, thereby enabling the user to visualize which of the detected fingertips the fingertip shown in the second fingertip image Ex11 is.

The processor 11 of the terminal device 1 according to Modification 2 of Embodiment 1 detects whether the fingertip shown in the captured image Img5 is of the right hand or the left hand. Accordingly, in the case of acquiring the fingerprint data of the fingers of both hands, the terminal device 1 according to Modification 2 of Embodiment 1 can distinguish whether the acquired fingerprint data is the fingerprint data of the right hand or the fingerprint data of the left hand.

When it is determined that the hand corresponding to the detected fingertip does not match the fingertip of the designated hand (the right hand or the left hand), the processor 11 of the terminal device 1 according to Modification 2 of Embodiment 1 generates a notification (for example, the message Msg3) requesting that imaging of the designated hand (the right hand or the left hand) and outputs the notification to the monitor 14. As a result, when acquiring the fingerprint data of the fingers of both hands, the terminal device 1 according to Modification 2 of Embodiment 1 can prevent the acquired fingerprint data of the right hand and the acquired fingerprint data of the left hand from being mixed by determining whether the hand shown in the captured image Img5 is the hand (that is, the designated hand) that is the acquisition target of the fingerprint data. The terminal device 1 can instruct the user which hand to hold over by displaying the notification (for example, the message Msg3) requesting imaging of the designated hand (the right hand or the left hand).

The terminal device 1 according to Embodiment 1 and Modification 1 to Modification 3 of Embodiment 1 further includes the processor 11 (an example of an evaluation unit) configured to calculate the evaluation value Scr11 indicating whether the fingerprint of the fingertip shown in the first fingertip image is in focus. The processor 11 outputs the first fingertip image for which the calculated evaluation value Scr11 is equal to or greater than the threshold value. Accordingly, the terminal device 1 can more efficiently acquire fingerprint data that has an evaluation value Scr11 of the threshold value and is more suitable for biometric authentication.

The processor 11 of the terminal device 1 according to Embodiment 1 and Modification 1 to Modification 3 of Embodiment 1 generates the confirmation screen Sc21 including the calculated evaluation value Scr11, the captured image Img1, and the second fingertip image Ex11, and outputs the confirmation screen Sc21 to the monitor 14. Accordingly, the terminal device 1 according to Embodiment 1 and Modification 1 to Modification 3 of Embodiment 1 enables the user to intuitively grasp the state of the fingertip shown in the captured image Img1 and whether the fingerprint of the fingertip indicated by each of the evaluation value Scr11 and the second fingertip image Ex11 is in focus.

As described above, the terminal device 1 according to Modification 3 of Embodiment 1 further includes the memory 12 (an example of a storage unit) configured to store the plurality of fingertip illustrations Ex71 and Ex72 having different edge intensities corresponding to the evaluation values Scr71 and Scr72. The processor 11 acquires the fingertip illustrations Ex71 and Ex72 corresponding to the calculated evaluation values Scr71 and Scr72 from the memory 12, generates the confirmation screens Sc71 and Sc72 including the fingertip illustrations, the evaluation values Scr71 and Scr72, and the captured images Img7, and outputs the confirmation screens Sc71 and Sc72 to the monitor 14. The fingertip illustrations Ex71 and Ex72 are respectively disposed outside the fingertip regions Ar71 and Ar72 of the confirmation screens Sc71 and Sc72. Accordingly, the terminal device 1 according to Modification 3 of Embodiment 1 can allow the user to intuitively grasp whether the captured image Img7 is a captured image in which the fingerprint of the fingertip is in focus without using the second fingertip image generated by directly cutting out the fingertip region including the first joint of the detected fingertip. In addition, the terminal device 1 does not enlarge and display the first fingertip image obtained by cutting out the fingertip region including the first joint of the detected fingertip as it is, so that it is possible to prevent theft of the enlarged and displayed second fingertip image (for example, theft by taking a secret photograph of the second fingertip image) by a third party positioned in the vicinity of the user or a person (the person who captures the image) other than the user, and to prevent leakage of biometric information of the user.

Although various embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, components in the various embodiments described above may be combined freely in a range without deviating from the spirit of the invention.

The present application is based on a Japanese Patent Application (Japanese Patent Application No. 2022-212090) filed on Dec. 28, 2022, and contents thereof are incorporated herein by reference.

INDUSTRIAL APPLICABILITY

The present disclosure is useful as presentation of a biometric information acquisition assistance device and a biometric information acquisition assistance method that assist in acquisition of fingerprint data suitable for fingerprint authentication in a contactless state.

REFERENCE SIGNS LIST

1 terminal device
10, 20 communication unit
11, 21 processor
12, 22 memory
13 camera

14 monitor
15 operation unit
16 sensor
2 server
23 fingerprint database
Ar11, Ar12, Ar13, Ar14, Ar15, Ar71, Ar72 fingertip region
Ex11, Ex12, Ex13, Ex14 second fingertip image
Ex71, Ex72 fingertip illustration
Fr01, Fr02, Fr03, Fr04, Fr05, Fr11 detection frame
Img1, Img2, Img3, Img4, Img5, Img6, Img7 captured image
Msg1, Msg3 message
Sc21, Sc22, Sc23, Sc24, Sc71, Sc72 confirmation screen
Scr11, Scr12, Scr13, Scr14, Scr71, and Scr72 evaluation Value
Sc31, Sc32, Sc6 alert screen
Sp11, Sp12, Sp13, Sp14B non-fingertip region
Sp14A fingertip image display region

The invention claimed is:

1. A biometric information acquisition assistance device, comprising:

a processor; and at least one memory including at least one program that, when executed by the processor, causes the processor to:

acquire a captured image of at least one fingertip captured in a contactless state;

detect the at least one fingertip shown in the captured image;

generate a first fingertip image obtained by cutting out a fingertip region including the detected fingertip;

generate a biometric information acquisition screen including the captured image and a second fingertip image disposed outside a first region including the fingertip region of the fingertip and obtained by enlarging the first fingertip image;

output the biometric information acquisition screen to a monitor, wherein the second fingertip image is superimposed on the captured image, in the biometric information acquisition screen, in a second region other than the first region including the fingertip region of the fingertip.

2. The biometric information acquisition assistance device according to claim 1, wherein the processor further detects an orientation of the fingertip shown in the captured image, and the processor rotates the orientation, for superimposing the second fingertip image in a predetermined orientation on the captured image in the biometric information acquisition screen, and displays the biometric information acquisition screen including the rotated second fingertip image.

3. The biometric information acquisition assistance device according to claim 2, further comprising:

a sensor that detects a gravity direction of the biometric information acquisition assistance device, wherein the predetermined orientation is an orientation of the gravity direction.

4. The biometric information acquisition assistance device according to claim 3, wherein on the biometric information acquisition screen, short sides of the captured image and the second fingertip image, each having a substantially rectangular shape, are each disposed parallel to long sides of the monitor, having a substantially rectangular shape.

5. The biometric information acquisition assistance device according to claim 1, wherein the processor determines a magnification of the first fingertip image based on a size available outside the first region in a display region of the monitor.

6. The biometric information acquisition assistance device according to claim 1, wherein the processor determines a magnification of the first fingertip image based on a size of the second region, which is outside the first region in a display region of the monitor, with the magnification being one times or more of the magnification of the first fingertip image, and generates the biometric information acquisition screen on which the second fingertip image is disposed in the second region.

7. The biometric information acquisition assistance device according to claim 1, wherein the first region includes the fingertip regions of the fingertips detected by the processor.

8. The biometric information acquisition assistance device according to claim 1, wherein the processor superimposes a frame line indicating the fingertip region of the fingertip corresponding to the second fingertip image among fingertips shown in the captured image.

9. The biometric information acquisition assistance device according to claim 1, wherein the processor superimposes frame lines indicating fingertip regions of a plurality of fingertips shown in the captured image detected by the processor, and highlights a frame line corresponding to the second fingertip image among the plurality of superimposed frame lines.

10. The biometric information acquisition assistance device according to claim 1, wherein the processor detects whether the fingertip shown in the captured image is of a right hand or a left hand.

11. The biometric information acquisition assistance device according to claim 10, wherein when the processor determines that a hand corresponding to the fingertip does not match a designated hand, the processor generates a notification requesting imaging of the designated hand, and outputs the notification to the monitor.

12. The biometric information acquisition assistance device according to claim 1, wherein the processor generates the biometric information acquisition screen including a calculated evaluation value, the captured image, and the second fingertip image, and outputs the biometric information acquisition screen to the monitor.

13. The biometric information acquisition assistance device according to claim 1, wherein the processor calculates an evaluation value indicating whether the fingertip shown in the first fingertip image is in focus, and the processor outputs the first fingertip image for which the calculated evaluation value is equal to or greater than a threshold value.

14. The biometric information acquisition assistance device according to claim 13, wherein the at least one memory stores a plurality of fingertip illustrations having different edge intensities corresponding to evaluation values, the processor acquires a fingertip illustration corresponding to the calculated evaluation value from the at least one memory, generates the biometric information acquisition screen including the fingertip illustration, the calculated evaluation value, and the captured image, and outputs the biometric information acquisition screen to the monitor, and the fingertip illustration is disposed outside the first region of the biometric information acquisition screen.

15. The biometric information acquisition assistance device according to claim 1, wherein the second fingertip image is superimposed on the second region, with the second region being a region of a hand shown in the captured image other than the first region.

16. The biometric information acquisition assistance device according to claim 1, wherein the second fingertip image is superimposed on a palm of a hand shown in the captured image.

17. A biometric information acquisition assistance method which is performed by a biometric information acquisition assistance device capable of acquiring biometric information from at least one fingertip, the biometric information acquisition assistance method comprising:

acquiring a captured image of the at least one fingertip in a contactless state;

detecting the at least one fingertip shown in the captured image;

generating a first fingertip image obtained by cutting out a fingertip region including the detected fingertip;

generating a biometric information acquisition screen including the captured image and a second fingertip image disposed outside a first region including the fingertip region of the fingertip and obtained by enlarging the first fingertip image, and outputting the biometric information acquisition screen to a monitor, wherein the second fingertip image is superimposed on the captured image, in the biometric information acquisition screen, in a second region other than the first region including the fingertip region of the fingertip.

18. A biometric information acquisition assistance device, comprising:

a processor; and at least one memory including at least one program that, when executed by the processor, causes the processor to:

acquire a captured image of at least one fingertip captured in a contactless state;

detect the at least one fingertip shown in the captured image;

generate a first fingertip image obtained by cutting out a fingertip region including the detected fingertip;

calculate an evaluation value indicating whether the fingertip shown in the first fingertip image is in focus;

generate a biometric information acquisition screen including the captured image and a second fingertip image disposed outside a first region including the fingertip region of the fingertip and obtained by enlarging the first fingertip image; and output the biometric information acquisition screen, including the first fingertip image for which the calculated evaluation value is equal to or greater than a threshold value, to a monitor.

* * * * *